(12) United States Patent
Musso

(10) Patent No.: US 7,353,183 B1
(45) Date of Patent: Apr. 1, 2008

(54) METHOD AND SYSTEM FOR MANAGING AND CLOSING A REAL ESTATE TRANSACTION

(75) Inventor: Daniel R. Musso, San Jose, CA (US)

(73) Assignee: Move, Inc., Westlake Village, CA (US)

( * ) Notice: Subject to any disclaimer, the term of this patent is extended or adjusted under 35 U.S.C. 154(b) by 1419 days.

(21) Appl. No.: 09/908,290

(22) Filed: Jul. 17, 2001

(51) Int. Cl.
  *G06F 17/60* (2006.01)
  *G06Q 10/00* (2006.01)

(52) U.S. Cl. .............................................. 705/9; 705/1

(58) Field of Classification Search ...................... None
  See application file for complete search history.

(56) References Cited

U.S. PATENT DOCUMENTS

| | | | |
|---|---|---|---|
| 3,736,409 | A | 5/1973 | Boyan |
| 4,870,576 | A | 9/1989 | Tornetta |
| 5,032,989 | A | 7/1991 | Tornetta |
| 5,182,705 | A | 1/1993 | Barr |
| 5,222,209 | A | 6/1993 | Murata |
| 5,490,097 | A | 2/1996 | Swenson |
| 5,548,506 | A | 8/1996 | Srinivasan |
| 5,563,994 | A | 10/1996 | Harmon |
| 5,592,664 | A | 1/1997 | Starkey |
| 5,630,069 | A | 5/1997 | Flores |
| 5,659,768 | A | 8/1997 | Forbes |

(Continued)

OTHER PUBLICATIONS

Ficek, Edmund F. Real Estate Principles and Practices. McMillan: 6th Edition, 1990. Chapter 17: Closing and Conveyance, pp. 376 and 407.*

(Continued)

*Primary Examiner*—Tariq R. Hafiz
*Assistant Examiner*—Dave Robertson
(74) *Attorney, Agent, or Firm*—Stinson Morrison Hecker LLP

(57) ABSTRACT

A computer implemented, interactive method and system for assisting real estate agents and their clients in managing and closing a real estate transaction. The invention includes the computer system's generation of a Gantt Chart which automatically tracks the entire real estate transaction, simultaneously providing each agent with the same visual presentation, on their own computer display device, of a description and status of each task to be performed by both agents in order to close the purchase and sale of a property. The Gantt Chart displays each task in a column on each agent's display device and adjacent to each task is a horizontal schedule bar which may contain at least one status indicator which indicates the status of its associated task. A document access indicator is also displayed as an icon adjacent to each task which involves the preparation and delivery of a real estate document. The agent selects the icon in order to display a desired document on the display device, and when the document is completed and delivered the Gantt Chart is automatically updated to indicate that the status of the task has changed. The Gantt Chart also provides each agent with access to a list of vendors to perform a task involving the utilization of a vendor service. As the agent and the selected vendor interact, the Gantt Chart is automatically updated to indicate the current status of obtaining the desired vendor service. When all tasks have been completed, the computer system achieves the complete history of the transaction and generates a pre-closing report. The system also provides each agent with the ability to simultaneously monitor and perform tasks for multiple transactions.

60 Claims, 29 Drawing Sheets

U.S. PATENT DOCUMENTS

| | | |
|---|---|---|
| 5,706,452 A | 1/1998 | Ivanov |
| 5,740,549 A | 4/1998 | Reilly |
| 5,745,110 A * | 4/1998 | Ertemalp .................... 715/764 |
| 5,867,155 A | 2/1999 | Williams |
| 5,893,074 A | 4/1999 | Hughes |
| 5,907,490 A | 5/1999 | Oliver |
| 5,974,391 A * | 10/1999 | Hongawa ....................... 705/7 |
| 5,991,732 A | 11/1999 | Moslares |
| 6,594,633 B1 * | 7/2003 | Broerman ...................... 705/1 |
| 6,684,196 B1 * | 1/2004 | Mini et al. .................... 705/26 |
| 2002/0095385 A1 * | 7/2002 | McAvoy et al. .............. 705/51 |
| 2004/0143450 A1 * | 7/2004 | Vidali ............................ 705/1 |
| 2004/0167798 A1 * | 8/2004 | Hastings ........................ 705/1 |

OTHER PUBLICATIONS

Clareity Consulting. Online Real Estate Transaction Management: Is it ready for prime time. Clareity Consulting and Communications, Inc. Feb. 2003.*

Lowery, Gwen. Managing Projects with Microsoft Project 4.0. Van Nostrand: 1994, p. 20-22.*

Wieners, Brad. "Microsoft Morphs into a Service Company," WIRED Magazine, Nov. 1997.*

* cited by examiner

SYSTEM TABLES 20

FORM TABLE 20(a)

|  | Form Name |
|---|---|
|  | Form Number |
|  | Task Title |
|  | Task Number |
|  | Location of Property |
|  | Type of Property |
|  | Buyer/Seller |

VENDOR TABLE 20(b)

|  | Vendor Name |
|---|---|
|  | Vendor Number |
|  | Task Title |
|  | Task Number |
|  | Location of Property |
|  | Vendor Order Form |

FIG. 9

SYSTEM TASKS TABLE 20(c)

| System Task ID | Task Name (abbreviated) | Task Name |
|---|---|---|
| 1 | Buyer Broker Agmt | Buyer Broker Representation Agreement |
| 2 | Listing Agmt. | Exclusive Agency Listing Agreement (And Right to Sell) |
| 3 | Selling Agmt. | Exclusive Authorization to Acquire Real Property |
| 4 | Leasing Agmt. | Exclusive Authorization to Lease or Rent |
| 5 | Manuf Housing Agmt | Manufactured Housing Listing Agreement |
| 6 | Mod of Terms | Modification of Terms: Authorization and Right to Sell |
| 7 | Non-Excl Agency | Non-Exclusive ("Open") Residential Listing Agreement |
| 8 | Probate Advisory | Probate Advisory |
| 9 | Probate Listing | Probate Listing Agreement |
| 10 | Res Listing Agmt | Residential Listing Agreement (Exclusive Authorization and Right to Sell) |
| 11 | Seller's Advisory | Seller's Advisory |
| 12 | Single Party Comp | Single Party Compensation Agreement |
| 13 | Noncnf Unit Addum. | Nonconforming Unit Addendum |
| 14 | Buyer Walk Insp | Buyer Walk-Through Inspection |
| 15 | Buyer's Insp Adv | Buyer's Inspection Advisory |
| 16 | Commission Agmt | Commission Agreement |
| 17 | Contingency Remove | Contingency Removal |
| 18 | Contingency Supp | Contingency Supplement/ Addendum |
| 19 | Contract Addendum | Contract Addendum |
| 20 | Counter Offer | Counter Offer |
| 21 | Employee Estoppel | Employee Estoppels Certificate |
| 22 | HOA Info Request | Homeowner Association Information Request |
| 23 | Interim Occup Agmt | Interim Occupancy Agreement -- Buyer in Possession prior to Close of Escrow |
| 24 | Lock Box Auth Add | Lock Box Authorization Addendum |
| 25 | Occup Agreement | Occupancy Agreement |
| 26 | Option Agreement | Lease with Option to Purchase Agreement |
| 27 | Purchase Agreement | Residential Purchase Agreement |
| 28 | Purchase Agmt Add | Purchase Agreement Addendum |

FIG. 9 continued

SYSTEM TASKS TABLE 20(c)

| 29 | IncDepositLDamages | Receipt for Increased Deposit/ Liquidated Damages |
|---|---|---|
| 30 | Recpt of Buyer Dep | Receipt of Buyer's Deposit |
| 31 | Recpt of Inc Dep | Receipt of Increased Deposit |
| 32 | Releas of Contract | Release of contract |
| 33 | Res Lse After Sale | Residential Lease After Sale -- Seller in Possession After Close of Escrow |
| 34 | Seller Financ Add | Seller Financing Addendum and Disclosure |
| 36 | Tenant Estoppel | Tenant Estoppels Certificate |
| 37 | 3-R Report | 3-R Report |
| 38 | Affil Bus Agmt | Affiliated Business Agreement Disclosure |
| 39 | TDS by Agent | Agent Transfer Disclosure Statement (Inspections form) |
| 40 | TDS Addum by Agent | Agents Addendum to Real Estate Transfer Disclosure Statement |
| 41 | Insp Dis by Agent | Agent's Inspection Disclosure |
| 42 | Buyer's Affidavit | Buyer's Affidavit (FIRPTA Compliance) |
| 43 | CA Non-Res Withhld | California Non-Resident Withholding Law (FIRPTA) |
| 44 | Chimney Insp Rpt | Chimney Inspection Report |
| 45 | AgencyConfirmation | Confirmation: Real Estate Agency Relationships |
| 46 | Contractors Insp | Contractors Inspection Report |
| 47 | Megan's Law | Data Base Disclosure -- Regarding Registered Sex Offenders |
| 48 | Discl Obligation | Disclosure Obligation |
| 49 | Agency Disclosure | Disclosure Regarding Real Estate Agency Relationship |
| 50 | Energy Consrv Insp | Energy Conservation Inspection and Recorded Compliance |
| 51 | Environ Risk Discl | Environmental Risk Disclosure Report |
| 52 | Seller's Financing | Seller's Financing Disclosure |
| 53 | Geologic Insp Rpt | Geologic, Seismic, and Flood Hazard Inspection Report |
| 54 | Hazard Ques | Hazards Report Questionnaire |

FIG. 9 continued

SYSTEM TASKS TABLE 20(c)

| 55 | HUD Notice | HUD Notice to Purchasers: For Your Protection: Get a Home Inspection |
|---|---|---|
| 56 | Lead-Based Paint | Lead-Based Paint and Lead-Based Paint Hazards Disclosure |
| 57 | Lead Paint Detect | Lead-Based Paint Detection |
| 58 | Manuf Home:TDS | Manufactured Home and Mobile Home: Transfer Disclosure Statement |
| 59 | Mkt Conditions Adv | Market Conditions Advisory |
| 60 | Mello-Roos Tax Zn | Mello-Roos Tax Zone Report |
| 61 | Mortgage Loan Dis | Mortgage Loan Disclosure Statement |
| 62 | Nat Hazard Dis Rpt | Natural Hazard Disclosure Report |
| 63 | Nat Hazard Dis Stm | Natural Hazard Disclosure Statement |
| 64 | Notice of Work | Notice of Work Completed/ Not Completed |
| 65 | Pool/ Spa Insp | Pool/ Spa Inspection Report |
| 66 | Preliminary Title | Preliminary Title Report |
| 67 | Property Insp | Property Inspection Report |
| 68 | RE TDS | Real Estate Transfer Disclosure Statement |
| 69 | Receipt for Docs | Receipt for Documents/ Contingency Removals |
| 71 | Regional Disclosur | Regional Disclosure |
| 72 | Res Hazard Guide | Residential Earthquake & Environmental Hazard Guide |
| 73 | Res Hazards Rpt | Residential Earthquake Hazards Report |
| 74 | Roof Insp Rpt | Roof Inspection Report |
| 75 | SF Board Gen Info | San Francisco Board of Realtors General information |
| 77 | Seller's Affidavit | Seller's Affidavit of No-foreign Status and/ or California Residency |
| 78 | Seller's Supp TDS | Seller's Supplemental TDS |
| 79 | Septic Insp Rpt | Septic System Inspection Report |
| 80 | Sewer Lat Insp Rpt | Sewer Lateral Inspection Report |
| 81 | SmokeDetectorCompl | Smoke Detector Statement of Compliance |
| 82 | Soils Insp Rpt | Soils Inspection Report |

FIG. 9 continued

SYSTEM TASKS TABLE 20(c)

| 83 | Termite Insp Rpt | Wood Destroying Pest & Organism Inspection Report |
|---|---|---|
| 84 | Tenancy-in-Common | Tenancy-in-Common Disclosure Statement |
| 85 | Undrgrnd Tank Insp | Underground Storage Tank (UST) Inspection Report or Disclosure |
| 86 | Water Conserv Aff | Water Conservation Affidavit |
| 87 | Well Insp Rpt | Well Inspection Report |
| 88 | Approval of Prking | Approval of Parking & Storage for Condo Sales |
| 89 | Condo Disclosure | Common Interest Development Disclosure |
| 90 | HOA Articles | Homeowner's Association Articles of Incorporation |
| 91 | HOA Financials | Homeowner's Association Budget & Financial Statement |
| 92 | HOA By-Laws | Homeowner's Association by-laws |
| 93 | HOA CC&Rs | Homeowner's Association CC&Rs |
| 94 | HOA Minutes | Homeowner's Association Meeting Minutes for the previous 12 Months |
| 95 | HOA Rules & Regs | Homeowner's Association Rules and Regulations |
| 96 | HOA Statutory Disc | Homeowner's Association Statutory Condominium Disclosure |
| 97 | Public Rpt | Public Report (Required for First Sale in Multi Units Buildings) |
| 98 | Req for HOA Docs | Request for Homeowner's Association Documents |
| 99 | Estoppels Addum. | Estoppels Addendum |
| 100 | Inc and Exp State | Income and Expense Statement |
| 101 | Rec of Agreements | Receipt and Approval of All Leases and Rental Agreements |
| 102 | Rec of Estopples | Receipt and Approval of All Rental Information Questionnaires (Estoppels) |
| 103 | Rental Prop Addend | Rental property Addendum |
| 104 | Vendor Recomm List | Vendor Recommendation List |
| 105 | Buyer/Seller Inst | Buyer and/ or Seller Instructions |

FIG. 9 continued

SYSTEM TASKS TABLE 20(c)

| 106 | Escrow Settlement | Escrow Settlement Statements |
|---|---|---|
| 107 | Home Warranty Plan | Home Warranty Plan Receipt or Waiver |
| 108 | HUD Closing State | HUD Closing Statement |
| 109 | Permit Search-City | Permit Search from City/ Town |
| 110 | Perm Search-County | Permit Search from County |
| 111 | Prequal Letter | Pre-qualification Letter |
| 112 | Closing Gifts | Closing Gifts |
| 113 | Archive Trans | Archive Transaction |
| 114 | Welcome Email | Welcome to new home email |
| 115 | Report Sale-MLS | Report Sale to MLS |
| 116 | Report Sale-Broker | Report Sale to Broker/Manager |
| 117 | Earthquake Safety | Earthquake Safety Booklet & Receipt |
| 118 | CMA | CMA (Market analysis) and Receipt of CMA |
| 119 | Estimate Proceeds | Give Seller Estimated Seller Proceeds |
| 120 | Trust Docs | Trust documents |
| 121 | Listing on MLS | Place Listing on MLS |
| 122 | Classified Ads | Prepare classified ads |
| 123 | Open House | Set up open house |
| 124 | Install Lock Box | Install lock box |
| 125 | Remove Lock Box | Remove Lock Box |
| 126 | For Sale sign | Install 'For Sale' sign |
| 127 | 'For Sale' sign | Remove 'For Sale' sign |
| 128 | Get key | Get keys for Buyer |
| 129 | Foundation Insp | Foundation Inspection |
| 130 | Sign Off | Sign Off |
| 131 | Home Warranty | Home Warranty |
| 132 | Buyers Tour | Buyers Tour |
| 133 | PreQual Loan | Pre Qualification |
| 134 | Brokers Demand | Broker's Demand for payment |
| 135 | Supp inst re:taxes | Supplemental Instructions Regarding Taxes |
| 136 | Closing Statement | Closing Statement |
| 137 | Witholding Exempt | Withholding Exemption Certificate for Real Estate Sales |
| 138 | Invoice | Invoice |
| 139 | Work Authorize | Work Authorization |

FIG. 9 continued

SYSTEM TASKS TABLE 20(c)

| 140 | HomeOwner's Guide | Receipt for "Homeowner's Guide to Environmental Hazard and Earthquake Safety" |
|---|---|---|
| 141 | Seller's Chklist | Supplemental Seller's Checklist |
| 142 | Arbitration | Arbitration |
| 143 | Title Insurance | Title Insurance |
| 144 | Settelement Est | Settlement Statement Estimated |
| 145 | Change Owner Rpt | Preliminary Change of Ownership Report |
| 146 | Commission Check | Commission Check |
| 147 | Settlement Stmt | Settlement Statement |
| 148 | General Provisions | General Information for Buyers and Sellers of Real Property |
| 149 | Lender Instruction | Lender's Instructions for Buyers and/ or Borrowers |
| 151 | Hazard Material | Hazardous Materials Disclosure |
| 152 | Regulation Z | Regulation Z |
| 154 | Grant Deed | Grant Deed |
| 155 | Escrow | Escrow |
| 156 | List Agmt. Addum. | Exclusive Authorization and Right to Sell Addendum |
| 157 | Submit Deposit | Submit Deposit with Escrow Holder, Trust Account, etc. |
| 158 | Take Possession | Take Possession of the Property |
| 160 | Earthquake Guide | Commercial Property Owner's Guide to Earthquake Safety |
| 161 | Env. Hazards Guide | Environmental Hazards: A Guide for Homeowners, Buyers and Tenants |
| 162 | Earthquake Guide R | Homeowner's Guide to Earthquake Safety |
| 163 | Lead Pamphlet | Protect Your Family from Lead in Your Home |
| 164 | Est. Buyer's Costs | Estimated Buyer's Costs |
| 165 | Prop. Report | Report of Residential Record |
| 166 | Water Heater Compl | Water Heater Statement of Compliance |
| 167 | Loan Contingency | Loan Contingency |
| 168 | Appr. Contingency | Appraisal Contingency |
| 169 | Verify Funds | Verification of Funds |

FIG. 9 continued

SYSTEM TASKS TABLE 20(c)

| 170 | Home Insurance | Homeowner's Insurance |
|-----|----------------|----------------------|
| 171 | Asbestos Insp  | Asbestos Inspection  |

FIG. 9 continued

TRANSACTION TABLES 21

PARTICIPANT TABLE 21(a)

| Listing Agent | |
|---|---|
| | Name |
| | Contact Information |

| Buyer's Agent | |
|---|---|
| | Name |
| | Contact Information |

| Seller | |
|---|---|
| | Name |
| | Contact Information |

| Buyer | |
|---|---|
| | Name |
| | Contact Information |

| Vendor | |
|---|---|
| | Name |
| | Contact Information |
| | Number |

PROPERTY TABLE 21(b)

| Property Address | |
|---|---|
| | Legal Description |
| | Price |
| | Type |
| | Square Footage |
| | Foundation |
| | Basement |
| | Lock Box Code |
| | Year Built |
| | Home Style |
| | Attic |

FIG. 10

TRANSACTION TASKS TABLE 21(c)

| Task Name/Title |
|---|
| Task Number |
| Form Number |
| Vendor Number |
| Transaction Number |

| Dates |
|---|
| Start |
| Due |
| Desired |
| Promised |
| Completed |

| Status |
|---|
| On Time |
| Pending |
| Received |
| Accepted |
| Rejected |

| | | S 28 | M 29 | T 30 | W 31 | T 1 | F 2 | S 3 | S 4 | M 5 | T 6 | W 7 | T 8 | F 9 | S 10 | S 11 | M 12 | T 13 | W 14 | T 15 | F 16 |
|---|---|---|---|---|---|---|---|---|---|---|---|---|---|---|---|---|---|---|---|---|---|
| ▨ On time (green) | | | | Jan 2001 | | | | | | | February 2001 | | | | | | | | | | |
| ▥ Late (red) | | | | | | | | | | | | | | | | | | | | | |
| ▦ No Resp. (yel.) | | | | | | | | | | | | | | | | | | | | | |
| ○ Desired (lt. grey) | | | | | | | | | | | | | | | | | | | | | |
| □ Promised (grey) | | | | | | | | | | | | | | | | | | | | | |
| X Complete (black) | | | | | | | | | | | | | | | | | | | | | |
| For Sale sign | ○ | X | | | | | | | | | | | | | | | | | | | |
| Preliminary Title | ○ | | ▨ | ▨ | X | | | | | | | | | | | | | | | | |
| RE TDS | ○ | | ▨ | ▨ | X | | | | | | | | | | | | | | | | |
| Purchase Agmt. | ○ | | ▨ | ▨ | ▨ | X | | | | | | | | | | | | | | | |
| Seller's Supp TDS | | | | | | | ▨ | ▨ | X | | | | | | | | | | | | |
| Buyer Walk Insp | | | | | | | ▨ | ▨ | ▨ | X | | | | | | | | | | | |
| Prequal Letter | | | | | | | ▨ | ▨ | ▨ | ▨ | X | | | | | | | | | | |
| PreQual Loan | | | | | | | ▨ | ▨ | ▨ | ▨ | ▨ | ▨ | ▨ | ▨ | ▨ | ▨ | ▨ | X | | | |
| Chimney Insp Rpt | | | | | | | | | | ○ | ▨ | □ | ▨ | ▨ | ▨ | ▨ | ▨ | ▨ | X | | |
| Contractors Insp | | | | | | | | | | ○ | ▨ | □ | □ | ▨ | ▨ | ▨ | ▨ | X | | | |
| Termite Insp Rpt | | | | | | | | | | ○ | ▦ | ▦ | ▦ | ▦ | ▦ | | | | | | |
| Geologic Insp Rpt | | | | | | | | | | ○ | ▨ | □ | □ | X | | | | | | | |
| Roof Insp Rpt | | | | | | | | | | ○ | ▨ | □ | ▨ | ▨ | ▨ | ▨ | ▨ | ▨ | ▨ | X | |
| Soils Insp Rpt | | | | | | | | | | ○ | ▨ | □ | ▨ | ▨ | ▨ | ▨ | ▨ | | | | |
| • • • | | | | | | | | | | | | | | | | | | | | | |
| Closing Statement | | | | | | | | | | | | | | | | | | | ▨ | ▨ | X |

TO: Vendor C
FROM: [Participant Table 21(a)]

- SERVICE REQUEST: Pest Inspection
- REQUEST DATE: 2/10/01
- DESIRED DATE: 2/20/01
- PROPERTY ADDRESS: [Property Table 21(b)]
- PROPERTY DESCRIPTION:

> Type:
> Square Footage:
> Foundation:
> Basement:
> Lock Box Code:
> Year Built
> Home Style:
> Attic:

} [Property Table 21(b)]

| SEND TO VENDOR |

Vendor's response/quote

- PROMISED DATE: 2/20/01
- QUOTE: $500.00

| SEND TO AGENT |

Agent's response

Accepted? [X]

Rejected? [ ]

FIG. 14

TASK HISTORY

[Select transaction task title]

[Update status]

| Task/Activity | Agent | Date | Document |
|---|---|---|---|
| Task – 1<br>Task – 2<br>Activity – 1<br>Task – 3<br>Activity – 2<br>• • •<br>Task – n<br>Activity – m | | | |

FIG. 15

Pre-Closing Report

| | Date Due | Date Completed | On Time |
|---|---|---|---|
| Financing: | | | |
| Receipt of Buyer's Deposit | 10-04-2000 | 10-04-2000 | ☑ |
| Receipt of Increased Deposit | 10-09-2000 | 10-09-2000 | ☑ |
| Seller Financing Addendum and Disclosure | 10-24-2000 | 10-24-2000 | ☑ |
| | | | |
| Contingencies: | Date Due | Date Completed | |
| Pre-qualification Letter | 10-05-2000 | 10-05-2000 | ☑ |
| Loan Contingency | 10-10-2000 | 10-07-2000 | ☑ |
| Appraisal Contingency | 10-10-2000 | 10-10-2000 | ☑ |
| Contingency Removal | 10-20-2000 | 10-20-2000: | ☑ |
| | | | |
| Disclosures | Date Due | Date Completed | |
| Agent Transfer Disclosure Statement (Inspections form) | 10-05-2000 | 10-05-2000 | ☑ |
| Real Estate Transfer Disclosure Statement | 10-10-2000 | 10-10-2000 | ☑ |
| Natural Hazard Disclosure Statement | 10-10-2000 | 10-07-2000 | ☑ |
| Lead-Based Paint and Lead Paint Hazards Disclosure | 10-10-2000 | 10-10-2000 | ☑ |
| Hazardous Materials Disclosure | 10-10-2000 | 10-10-2000 | ☑ |
| Mortgage Loan Disclosure Statement | 10-10-2000 | 10-10-2000 | ☑ |
| | | | |
| Inspections: | Date Due | Date Completed | |
| Wood Destroying Pest & Organism Inspection Report | 10-05-2000 | 10-05-2000 | ☑ |
| Geologic, Seismic, and Flood Hazard Inspection Report | 10-10-2000 | 10-07-2000 | ☑ |
| Roof Inspection Report | 10-02-2000 | 10-02-2000 | ☑ |
| Soils Inspection Report | 10-03-2000 | 10-03-2000 | ☑ |
| Asbestos Inspection | 10-04-2000 | 10-03-2000 | ☑ |
| Property Inspection Report | 10-04-2000 | 10-03-2000 | ☑ |

FIG. 16

METHOD AND SYSTEM FOR MANAGING AND CLOSING A REAL ESTATE TRANSACTION

FIELD OF THE INVENTION

The present invention generally relates to the field of project management, and specifically, to the field of managing a real estate transaction.

BACKGROUND OF THE INVENTION

At the present time, real estate transactions involving the sale of residential real property are generally performed in accordance with the business method disclosed in FIG. 1 (prior art). The transaction is managed by a listing agent, representing a seller who has agreed to list a residential property for sale using the listing agent's real estate brokerage company, which lists or advertises the seller's property for sale on a multiple listing service. The buyer is represented by a buyer's agent who is usually associated with another brokerage company.

The purchase and sale transaction normally commences when the buyer locates a listed property and retains the buyer's agent to represent the buyer, and to manage and ultimately close the transaction. One of the first tasks of the buyer's agent is to prepare a written purchase and sale agreement which constitutes the buyer's offer to purchase the listed property. Most real estate agents today use real estate form documents which have been approved for use by their local real estate board. The buyer's agent may obtain a paper copy of a purchase and sale agreement and manually complete the form document by filling in the appropriate blank spaces, checking the applicable boxes, having the buyer sign the offer, and mailing or delivering the offer to the listing agent. Alternatively, if the buyer's agent has electronic access to the real estate form documents, the offer may be completed by using the agent's computer display device. The completed digital document may then either be downloaded to a paper copy for signature by the buyer, or the buyer may sign the offer electronically. The paper purchase offer is then delivered or mailed to the listing agent, or the electronically completed digital document may be emailed to the listing agent. Similarly, the listing agent may either accept the offer or submit a counteroffer by using preprinted or electronically transmitted forms.

Once an agreement to purchase and sell the property has been reached, each agent independently creates his or her own list of tasks that must be performed in order to close the transaction. Normally, the agents do so by using a paper file folder or file jacket to manually keep track of each task and whether the task has been completed. They also retain a copy of each document they either prepared or received in the file folder. Each agent, independent of the other agent, manually calendars the dates that tasks must be completed and monitors the progress of each task. As a result, an agent is not able to monitor the progress of the other agent in completing his or her tasks. Rather, each agent waits to be notified by the other agent that a specific task has been completed. This lack of coordination between the agents is a significant limitation in the current business model.

Another limiting and inefficient aspect of the manner in which real estate transactions are presently managed relates to the ordering of services from vendors. Current practice requires each agent to contact, usually by telephone, a specific vendor to determine the vendor's availability and then to negotiate a contract, again over the telephone. Once a tentative oral agreement is reached, the vendor will usually mail a written contract to the agent for acceptance by the agent and/or the agent's client. The agent then delivers or mails the signed contract to the vendor. Normally, the vendor will not agree to commence work until the contract is received. Depending upon the complexity of a given real estate transaction, each agent may be responsible securing vendor services from several different vendors, and once the vendors have agreed to perform the requested service, it is solely up to each agent to monitor the vendor's progress. Since time is often the "essence" of a purchase and sale agreement, if just one vendor fails to deliver timely, the transaction may be unfortunately terminated. Thus, the agents must be constantly vigilant and well organized to prevent a default.

Yet another limitation relates to the manner in which the real estate form documents are provided by each agent to their respective clients and to the other agent. In a typical geographical area, there are approximately 30 to 50 different real estate forms that must be timely completed and/or delivered. Again, it is the responsibility of each agent to obtain the necessary form documents and to deliver them timely. The failure to timely deliver any one of these documents may also jeopardize the closing.

An inherent limitation of the current business method illustrated in FIG. 1 is that, due to the complexity and time sensitive nature of each task, it is difficult for agents to manage several real estate transactions at the same time, without substantially increasing the risk that serious errors will be made.

Accordingly, it is the purpose of the present invention to overcome the limitations described above by providing a business method which enhances the efficiency and accuracy of the real estate closing process, and facilitates the agent's ability to manage several real estate transactions at the same time.

SUMMARY OF THE INVENTION

The present invention comprises of new and unique computer implemented, interactive method and system for assisting real estate agents and their clients in more efficiently and accurately managing and closing a real estate transaction. More specifically, the invention includes the computer system's generation of a Gantt Chart which automatically tracks the entire real estate transaction, simultaneously providing each agent with the same visual presentation, on their own computer display device, of a description and status of each task to be performed by both agents. The Gantt Chart displays a list of transaction tasks in a column on the Chart and displays a horizontal schedule bar adjacent to each transaction task. The transaction tasks represent all of the tasks that must be performed in order to close the transaction and each horizontal schedule bar contains a time line of consecutive calendar dates, and within the time line, certain dates are highlighted to alert the agents concerning certain important dates. For each transaction task that involves the utilization of a real estate form document, a document access indicator icon is located on the Gantt Chart adjacent to the transaction task which requires the completion and/or delivery of a real estate form document. When an agent uses his or her computer input device, such as a mouse, to "click on" or select the icon, the computer system displays a form document which the system partially completes, if necessary, by using information stored in the system's memory. When the document is provided to the agent's client or to the other agent the system automatically updates the Gantt Chart. Similarly, for each transaction task that involves the performance of a service by a vendor, a vendor access indicator icon is located on the Gantt Chart adjacent to the transaction task which requires the utilization of the vendor's service. By selecting this icon, a vendor display window appears over the Gantt Chart, which displays a plurality of task vendors who provide the necessary service. By selecting one of the vendors, the system then partially completes and displays a vendor order form, which the agent uses to order the required service, and which the vendor uses to either accept or reject the order request. The Gantt Chart is also automatically updated at various times during the vendor ordering process.

Although the computer system which comprises the process of creating and using the Gantt Chart will be more fully described as it applies to real estate transactions within the geographical jurisdiction of real estate boards within the United States, it will be readily understood that the present invention is equally applicable to other countries as well. The process will normally be initiated by a buyer's agent after his or her client, a buyer, has located a listed property for sale by a seller, represented by a listing agent. The buyer's agent, using a client computer system, logs onto a server computer system, using a password, and indicates a desire to use a Gantt Chart to manage and, potentially, close the purchase of the property for the buyer. Initially, the programmed server computer prompts the buyer's agent to identify the buyer and buyer's contact information and the information is stored in a participant table. The buyer's agent also identifies the street address of the listed property which is stored in a property table. Based upon the property's street address, the server's program accesses a multiple listing service maintained by the local real estate board serving the geographical area where the property is located, and stores a complete description of the property in the property table, and stores the identity and contact information of the owner and the listing agent in the participant table. Similarly, the server's program obtains a list of form documents from a real estate forms database, which the local real estate board has recommended that real estate agents use in closing a transaction, and stores the information in a forms table. The program also obtains from a vendor database a list of vendors who are available to provide the services needed to close a real estate transaction within the general geographical area of the listed property, and stores the list of vendors in a vendor table. The program also associates a vendor order form with each vendor. Finally, a system administrator stores in a system tasks table a list of system tasks which contains all of the tasks that the agents may have to perform in order to close a real estate transaction.

At this point, the server's program displays the list of system tasks to the buyer's agent, and the buyer's agent is prompted to preliminarily identify a list of transaction tasks by selecting each transaction task from the list of system tasks which the buyer's agent determines may need to be performed. Once the list of transaction tasks has been identified, the server is programmed to automatically obtain a list of transaction form documents, from the previously obtained list of system form documents, by identifying each system form document that should be used in connection with the performance of a specific transaction task, and each transaction form document which is so identified is associated or related to its specific transaction task. In a similar fashion, the system's program obtains a list of transaction vendors, from the previously obtained list of system vendors, by identifying each system vendor who has agreed to provide a service related to one of the transaction tasks, and each transaction vendor so identified is associated or related to its specific transaction task. At the same time, a vendor form is also associated with each transaction vendor, since vendor forms were previously associated with all system vendors.

Next, the system's program displays a task scheduler to the buyer's agent. The scheduler prompts the agent to establish a schedule for each transaction task by having the agent input a "start" date by which performance of a task is to commence, and a "due" date by which the task must be completed.

At this stage in the process, the system's program generates a buyer's agent's preliminary Gantt Chart and displays the Chart to the buyer's agent. The Chart is preliminary at this point since the buyer's agent has not yet made an offer to purchase the listed property by completing a purchase and sale agreement. When the buyer's agent is ready to present an offer, he or she selects the document access indicator icon on the Gantt Chart which is adjacent to the task having the title, for example, "Purchase Agreement." The system's program then displays a purchase and sale agreement form document which has been approved for use by the agent's local real estate board and automatically partially completes the form by filling in some of its blank spaces or fields with the information stored in the tables. The buyer's agent then completes the form, and obtains the buyer's agreement to present the offer to the listing agent. In a preferred embodiment, the buyer signs the purchase and sale agreement using electronic signature software (e.g., electronic signature and approval management software by "Silanis"). The buyer's agent then notifies the listing agent that an offer has been made by selecting a "send" icon on the Gantt Chart.

For the purpose of the present summary, it is assumed that the listing agent has previously logged onto the server which has created a listing agent's preliminary Gantt Chart of the preliminary transaction tasks that the listing agent would normally perform before offering the property for sale. As a result, when the buyer's agent completes an offer to purchase set forth in a purchase and sale agreement and selects the "send" icon, the server's program displays the completed purchase and sale agreement offer to the listing agent in a window over the listing agent's Gantt Chart. The listing agent reviews the offer with the seller and either accepts the offer, or rejects the offer and submits a counteroffer, or simply rejects the offer and terminates any further negotiation. If the offer is accepted, the seller preferably indicates acceptance by electronically signing the offer. If the seller desires to counter the offer, the listing agent selects the transaction task title which describes the task for submitting counteroffers (e.g., "Counter Offer"), and the listing agent completes the counteroffer form on the listing agent's display device and selects the "send" icon. The server's program automatically sends the counteroffer to the buyer's agent by simply displaying the counteroffer to the buyer's agent. At the same time, the server's program displays a new counteroffer transaction task for use by the buyer's agent in the event that the buyer desires to submit a counteroffer. The system allows as many counteroffers as are necessary in order to reach an agreement.

When an agreement is reached, the server's program prompts both agents to update the Gantt Chart's transaction task list by displaying the system task check list window to both agents, and the agents identify and select all of the additional transaction tasks that must be performed in order to close escrow. After all additional transaction tasks have been selected, the server's program identifies certain fields on the purchase and sale agreement which contain dates that need to be monitored and financial information that needs to be transferred to other real estate forms. For example, each date identified on the completed purchase and sale agreement by which a transaction task must be completed is transferred to a Schedule Manager and each field containing financial information is transferred to either a seller's or buyer's closing statement. Next, the Schedule Manager displays a scheduler screen to both agents, which they use to schedule dates that have not been established on the purchase and sale agreement, or to modify dates. At this point, the server's program automatically schedules and updates each horizontal schedule bar associated with a scheduled transaction task. The date by which a transaction task must be completed is shown by a horizontal green bar which extends from the "start" date through its "due" date, and the current date is highlighted in yellow. The server's program next creates and displays a consolidated Gantt Chart to both agents which displays all of the preliminary and additional transaction tasks and each task's associated schedule bar which extends from the task's start date to its due date. The consolidated Gantt Chart is now in a condition to be used interactively by both agents in order to manage and potentially close the real estate transaction.

The agents will primarily interact with the consolidated Gantt Chart by ordering vendor services and completing form documents. A vendor service is ordered by selecting the vendor service access indicator icon on the agent's display device which displays a window over the Gantt Chart containing a description of the vendors who are available to provide the selected service. The agent selects the vendor he or she wants to use, and the server's program displays the vendor order form which the program has associated with the vendor. The agent completes the order form electronically, indicating a "desired" date for the service, and the Gantt Chart is automatically updated by displaying a light gray colored box within the green schedule bar indicating the date the service is "desired." The vendor is provided with access to the vendor order form as a web page over the Internet by sending the agent's web page URL address to the vendor by email. The vendor then uses an Internet browser to obtain and display the vendor order form web page on the vendor's computer display device. At this point the horizontal schedule bar adjacent to the vendor's transaction task on the Gantt Chart is automatically changed from green to yellow indicating that the transaction is "pending" in that agent has sent the order but the vendor has not yet responded with a response and quote. The vendor responds by either accepting or denying the request for a quote to perform the service. If the vendor accepts the request for a quote, the vendor completes the vendor order form by quoting a price for the service and providing a "promised" date by which the service will be completed. The server alerts the agent that the vendor has submitted a response by displaying the vendor order form in a window over the Gantt Chart. If the vendor's "promised" date is prior to the "desired" date, the agent may accept the vendor's quote by selecting an "accepted" indicator on the vendor order form and notifies the vendor by email that the accepted order may be obtained and displayed as a web page. If the agent does not accept, he or she may simply not respond and obtain a quote from another vendor.

Once a vendor quote and "promised" date have been accepted by the agent, the server's program automatically updates the Gantt Chart by changing the yellow bar back to green, indicating that an agreement has been reached, and the vendor's "promised" date appears as a gray colored box within the "on time" green bar. When the vendor completes the service and submits a report (e.g., title report, termite report or geological report), the agent who receives the report automatically updates the Gantt Chart by using a Task History screen indicating that the task has been "completed." If the vendor service is completed on time, the system automatically updates the Gantt Chart by illuminating a black box within the green schedule bar, at the time the task was completed and corresponding to the date the report was received. If a report is not received by the "due" date, a red square is added to the schedule bar starting with the first day the report is late, and an additional red square is added to the bar for each successive date until the report is received.

The agents also interact with the Gantt Chart when they complete and share form documents. A desired document is accessed by the agent by clicking on the document access indicator which is adjacent to the transaction task which is associated with the desired document, and after the document is displayed to the agent, he or she either sends the document to his or her client or to the other agent. When the document is sent, the system's program illuminates a black box within the green schedule bar corresponding to the date of the document was provided, indicating on the Gantt Chart that the task of providing the document to the agent has been completed timely. The system's program also automatically partially completes some form documents before the documents are displayed by using information stored in tables within the system's server.

When the schedule bar for each transaction task has been illuminated with a black square (i.e., the transaction task has been completed), the system's program generates a pre-closing report which sets forth all of the transaction tasks that had to be completed in order to close the real estate transaction and indicates whether each task has been completed on time. If all tasks have been timely completed, the program recommends that the transaction is in a condition to be closed, consummating a sale of the seller's property to the buyer. If any transaction task has not been completed timely, the pre-closing report prompts the agents to review the transaction tasks that were completed late. At the same time, the server's program automatically updates the seller's and buyer's closing statements in order to reflect any changes that were made in the financial aspects of the transaction.

An important and useful advantage of the present invention is that it also allows the agents to monitor more than one real estate transaction at a time by simultaneously displaying multiple Gantt Chart windows on their respective display devices. The Gantt Charts may also be displayed in series or sequentially, allowing the agents to quickly scroll or "page through" all of their pending real estate transactions. Another important feature is that at the end of each transaction, the status of each transaction task, and all of the documents and vendor orders that were generated are stored in a transaction folder table, identified by the property involved in the transaction, whether the transaction closed or not. As a result, over time the agents will accumulate a complete and comprehensive historical record of all of the transactions that have occurred concerning a specific real property. This historical record should greatly assist future sellers in fully disclosing all material information about their property, and will similarly assist buyers in obtaining such information.

BRIEF DESCRIPTION OF THE DRAWINGS

The present invention is described in additional detail by reference to the accompanying drawings, in which:

FIG. 9 diagrammatically illustrates a Forms Table, Vendor Table and System Tasks Table which are used by the present invention to store information which the system uses to generate Gantt Charts, form documents, vendors and vendor order forms.

FIG. 10 diagrammatically illustrates a Participant Table, Property Table, and Transaction Tasks Table which are used by the present invention to store information which the system uses to generate Gantt Charts, form documents, vendors, vendor order forms, and to archive transactions.

FIG. 12 diagrammatically illustrates a consolidated Gantt Chart which is generated by the system.

FIG. 14 diagrammatically illustrates a vendor order form which the real estate agents use to order vendor services and vendors use to submit responses.

FIG. 15 diagrammatically illustrates a Task History screen which the real estate agents use to schedule transaction tasks and update the status of tasks.

FIG. 16 diagrammatically illustrates a pre-closing report which is generated by the system when all transaction tasks involved in a transaction have been completed.

DETAILED DESCRIPTION OF INVENTION

Figure 1:
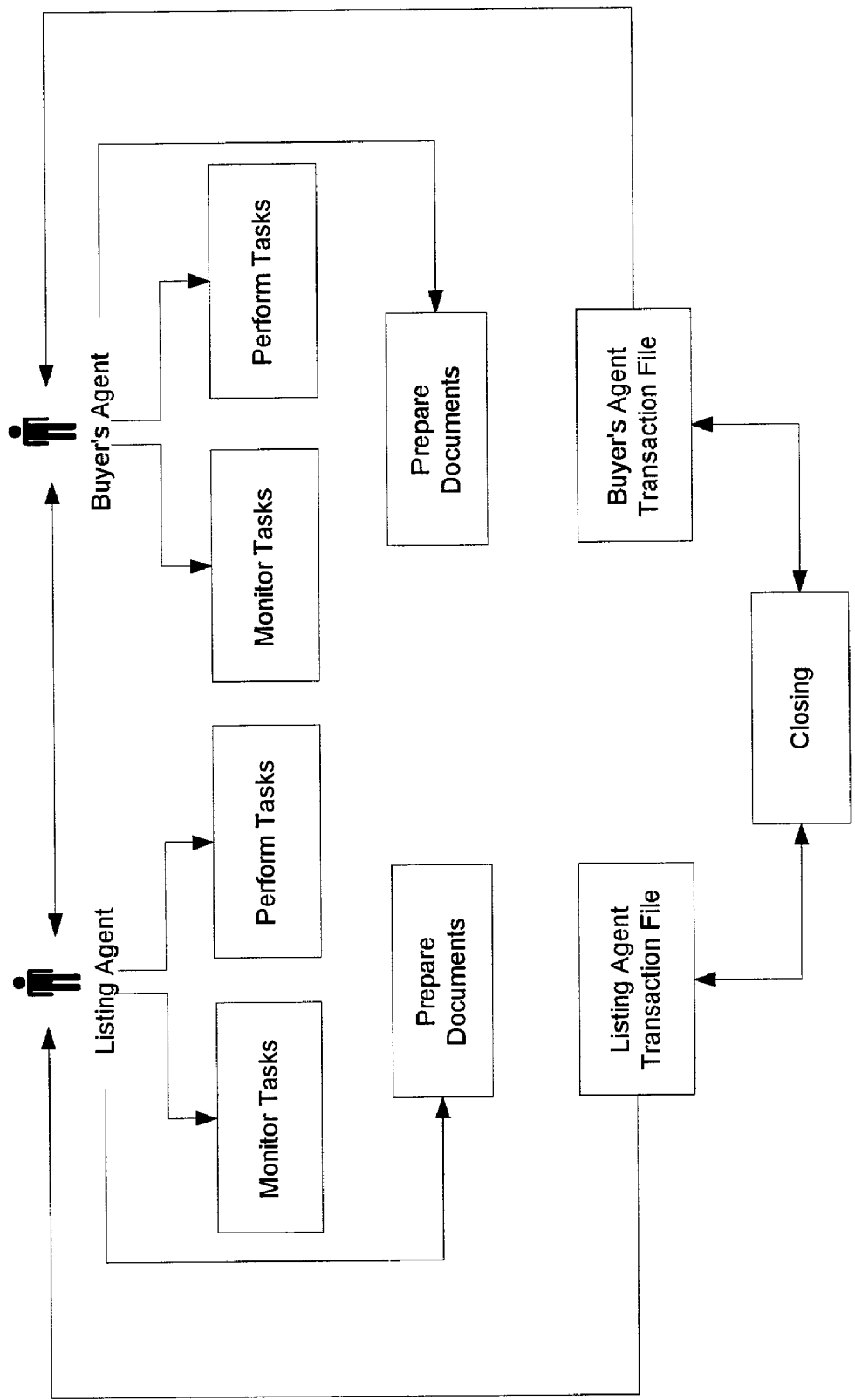
FIG. 1 (prior art) is a block diagram of the manner in which a typical transaction to purchase and sell real property is presently managed by real estate agents.
Figure 2:
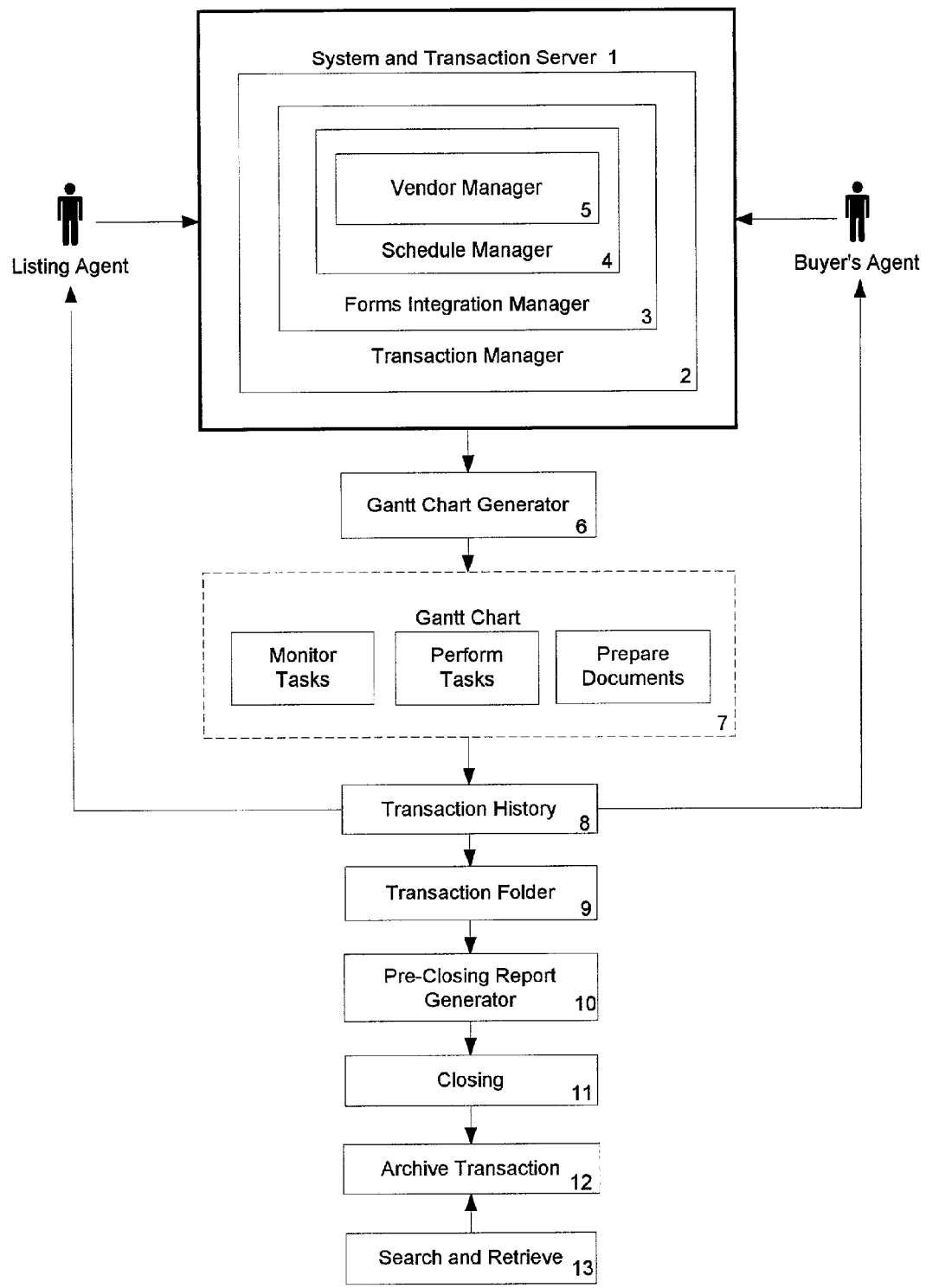
FIG. 2 is a block diagram which generally illustrates the computer system of the present invention.

A general description of the present invention which comprises a computer implemented, interactive method and system for assisting real estate agents in more efficiently and accurately managing and closing a real estate transaction is illustrated in FIG. 2. A listing agent and a buyer's agent, each using a client computer, are electronically connected over a network, either wired or wireless, to a System and Transaction Server 1 computer which contains, among other things, a processor for executing programs, a memory for storing data, a Transaction Manager 2 unit program unit which manages several aspects of the agents' use of the System and Transaction Server 1, a Forms Integration Manager 3 unit which manages the agent's interaction with real estate form documents, a Schedule Manager 4 unit which manages the schedule of transaction tasks, and a Vendor Manager 5 unit which manages the use of vendors to perform certain transaction tasks.

A Gantt Chart Generator 6 unit displays the same consolidated Gantt Chart 7 to both agents on their respective client computer display devices.

The Gantt Chart 7 is designed to enable each agent to interactively use the Gantt Chart 7 to monitor the status of the transaction tasks that they both need to perform in order to close a real estate transaction, and to assist each agent in performing the tasks and in preparing the documents that are required to close the real estate transaction. As the agents interact with the Gantt Chart 7 to prepare documents or perform tasks, such as ordering vendor services, the Gantt Chart Generator 6 automatically updates the Gantt Chart 7 to display the new status of a task. For tasks that the agents perform that do not involve an interaction with the Gantt Chart 7, a Transaction History 8 module is provided which enables each agent to record each action taken in the performance of a given transaction task, and when the status of a task changes (e.g., when the task is completed), the agent records the change in status, and the Gantt Chart 7 is automatically updated.

A Transaction Folder 9 table is utilized by the Transaction Manager 2 unit to store each document that has been completed by an agent, and/or provided to the agent's client and/or to the other agent. The Transaction Folder 9 also contains the entire transaction history and status of each transaction task performed by the agents.

When all transaction tasks have been completed, a Pre-Closing Report Generator 10 automatically generates a pre-closing report which lists each task that has been completed, the date of completion, and whether the task was completed on time. The pre-closing report is then provided by the agents to their clients and to the escrow officer that has been selected to perform the Closing 11. At the same time, the Pre-Closing Report Generator 10 automatically updates the seller's and buyer's closing statements in order to reflect any changes that were made in the financial aspects of the transaction, and the closing reports are provided to the escrow officer. If the transaction closes, an Archive Transaction 12 module archives or stores the contents of the Transaction Folder 9, which contains all of the documents that were prepared and a history of all of the tasks that were performed by the agents, into an archive database. Finally, if either agent, or his or her respective client, desires to access any of the documents or tasks performed in connection with a transaction, a Search and Retrieve 13 module is utilized to locate, display and/or print any or all of the documents that were prepared and/or all of the transaction task performance histories that were recorded by the agents.

Figure 3:
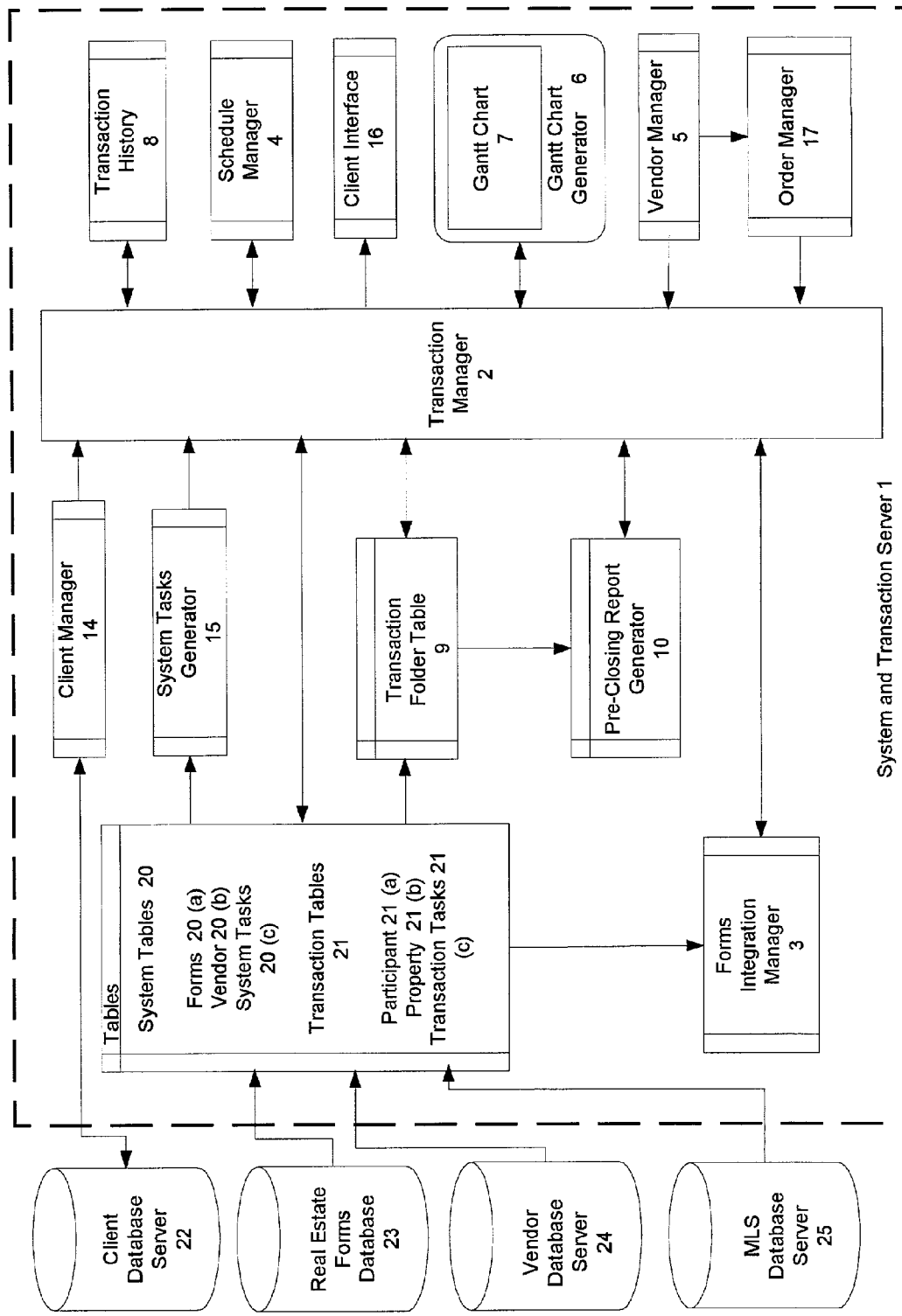
FIG. 3 is a block diagram which more specifically illustrates the computer system of the present invention.

A more detailed description of the relationships between the System and Transaction Server 1 unit and its various programs, and the interaction between the System 1 and various database servers is illustrated in FIG. 3. In a preferred embodiment, each real estate agent within a given geographical area, defined by the limits of the authority of a local real estate board, is provided with access to at least one System and Transaction Server 1 which serves that geographical area. Each agent accesses the System 1 by using a client computer system having a processor for executing programs, a memory for storing data, a display device, keyboard and mouse for inputting data, and each client computer is in electronic communication, either wired or wireless, with the System 1. The agents use their client computer to log onto the System 1 by entering a previously authorized password.

The information or data that the System and Transaction Server 1 uses to execute its programs is stored in a Client Database Server 22, Real Estate Forms Database 23, Vendor Database Server 24, MLS Database Server 25, and a System Tasks Table 20(*c*) which is allocated to a portion of memory within the System 1. The first time an agent uses the System 1 to manage a real estate transaction for his or her client, a Client Manager 14 unit within the System 1 prompts the agent to input the name, contact information, email address and other information about the client, into the System 1, and the Client Manager 14 unit stores the client's information in the Client Database Server 22 and the Transaction Manager 2 unit stores the information in a Participant Table 21(*a*), also allocated to a portion of memory within the System 1. The next time the same agent, or another authorized agent, accesses the System 1 in connection with a real estate transaction for the same client, the Client Manager 14 unit uses the Client Database Server 22 to obtain the client's contact and other information. The Real Estate Forms Database 23 contains a complete list of all of the real estate form documents that have been approved for use by the local real estate board having geographical jurisdiction over the transaction. These form documents are retrieved by the Transaction Manager 2 unit and are stored in a Forms Table 20(*a*), also allocated to a portion of memory within the System 1. The Vendor Database Server 24 contains a complete list of all of the vendors who are available to provide services within the same, general geographical area. The identity of the vendors are retrieved by the Transaction Manager 2 unit and are stored in a Vendor Table 20(*b*), also allocated to a portion of the server's memory. In addition, the Transaction Manager 2 unit receives input from a system's administrator, using a server data input device, which associates a vendor order form with each vendor stored in the Vendor Table 20(*b*). The MLS Database Server 25 contains a description of each real property that has been listed for sale within the local board's jurisdiction, and also contains the name, contact information and email address of the seller and the seller's listing agent. The information about the property is similarly retrieved by the Transaction Manager 2 unit and the description of the real property is stored in a Property Table 21(*b*), also allocated to a section of the server's memory, and the seller and listing agent information is stored in the Participant Table 21(*a*), unless the information has previously been obtained by the listing agent using the Client Manager 14 unit. Finally, the contents of the System Tasks Table 20(*c*) is established by the system administrator who stores in the table each task that may be required to be performed in order to close any real estate transaction within the geographical jurisdiction of the board. The information stored in the Tables is kept current due to the fact that the Databases are continually updated, and the System 1 uploads the information contained in the Databases to the Tables each time an agent accesses the System 1 to initiate a new transaction.

After the listing agent and buyer's agent have both logged onto the System 1 and have been identified as representing a seller and buyer, respectively, in connection with a specific real property, the System Tasks Generator 15 generates and simultaneously displays to each agent on his or her display device a list of system tasks, obtained from the System Tasks Table 20(*c*). The display prompts each agent to identify and select each preliminary task which he or she would normally perform prior to and during the successful negotiation of a purchase and sale agreement. When these preliminary tasks have been identified, a Schedule Manager 4 unit displays a Task Scheduler screen to both agents, which they use to establish a schedule for the commencement ("start date") and the completion ("due date") for each task. At this point, the System Tasks Generator 15 stores the preliminary transaction tasks and each task's associated schedule in a Transaction Tasks Table 21(*c*) which is allocated to a portion of the server's memory. The Gantt Chart Generator 6 then uses the information in the Transaction Tasks Table 21(*c*) to generate a preliminary Gantt Chart 7 for the buyer's agent which contains, among other things, the preliminary tasks the agent has selected and scheduled. Similarly, the Gantt Chart Generator 6 generates a preliminary Gantt Chart 7 for the listing agent based upon the preliminary tasks previously selected and scheduled by the listing agent. At the same time, the Forms Integration Manager 3 unit obtains a purchase and sale agreement form document, including counteroffer forms, from Forms Table 20(*a*), and associates in the Transaction Tasks Table 21(*c*) the purchase and sale agreement form document to the corresponding transaction task displayed on the Gantt Chart 7 for the buyer's agent entitled, for example, "Purchase Agreement" and similarly associates in the Table 21(*c*) a counteroffer form to the corresponding transaction task displayed on the Gantt Chart 7 for the listing agent entitled, for example, "Counter Offer." As will be described in more detail in connection with FIGS. 4 and 5, the agents use the Gantt Chart 7 and its document completion and display functions to electronically negotiate the purchase and sale of the property.

If the agents successfully negotiate an agreement, a Schedule Manager 4 unit identifies each field or set of information on the completed purchase and sale agreement which contains the schedule for a particular task. The Schedule Manager 4 unit then uses the set of information to determine a "start date" and a "due date" for each task and associates each date with a system task within the list of system tasks stored in the System Tasks Table 20(*c*). Next, the System Tasks Generator 15 again displays the list of system tasks so that the agents may complete the selection of the additional system tasks which must be performed pursuant to the purchase and sale agreement in order to close the transaction. Once the agents have completed their selection of additional system tasks, the tasks are stored as additional transaction tasks in the Transaction Tasks Table 21(*c*), and to the extent that any additional system task has an associated schedule, the schedule is also stored in the Table 21(*c*) along with the schedule's associated transaction task. At this point, the Schedule Manager 4 unit again displays a Task Scheduler screen to both agents, which they use to schedule start and due dates for any transaction task that has not already been automatically scheduled by the Schedule Manager using the schedule information contained within the purchase and sale agreement. When all transaction tasks have been scheduled by the Schedule Manager 4 unit, the Gantt Chart Generator 6 generates and displays a single, consolidated Gantt Chart 7, displaying all preliminary and additional transaction tasks, to be used by the agents to monitor and perform the transaction tasks in accordance with the established schedule, and to prepare the documents needed to close the transaction. A Client Interface 16 module is provided which enables the seller and buyer to also access and view the Gantt Chart in order to monitor the progress of the transaction. The seller and buyer gain access to the System and Transaction Server 1 by using his or her own client computer system, each having a data entry device and a display device, which is in electronic communication with the Server 1, and they are provided access to the Gantt Chart by using a pre-authorized unique access code which the Transaction Manager 2 unit issues to the seller and buyer when their respective agents commence a transaction.

A Vendor Manager 5 unit identifies each transaction task that requires the services of a vendor (e.g., title company and pest control operator), and for each transaction task identified, obtains a list of vendors from the Vendor Table 20(*b*) which includes the vendors who are available to provide a specific service. Then, the Vendor Manager 5 unit stores in memory each list of vendors and the vendor's associated transaction task. When an agent uses the Gantt Chart 7 to select a transaction task to be performed, which requires the service of a vendor, the Vendor Manager 5 unit displays, in a window over the Gantt Chart 7, the list of vendors associated to the transaction task, prompting the agent to select one of the vendors to perform the task. Selecting a vendor causes the Vendor Manager 5 unit to store the vendor's identity and contact information in the Participant Table 21(*a*), and an Order Manager 17 unit displays a vendor order form, which has been previously stored in memory and associated to the selected vendor. The vendor order form is partially completed by the Order Manager 17 unit, by using the information stored in the Participant Table 21(*a*) and Property Table 21(*b*). The agent then completes the vendor order form and notifies the vendor that the order is available for the vendor's response. If the vendor accepts the agent's order request and the agent, on behalf of his or client, accepts the vendor's delivery schedule and price, the vendor order form becomes a completed agreement, which is stored in a Transaction Folder Table 9. A more detailed description of the process of ordering vendor services and the associated process of updating the Gantt Chart 7 is presented in connection with FIGS. 7 and 8.

Each time a Gantt Chart 7 is generated, the Forms Integration Manager 3 unit identifies each transaction task that requires the preparation of a form document (e.g., "Real Estate Transfer Disclosure Statement") and each form document is associated in memory with its relevant transaction task. When an agent uses the Gantt Chart 7 to select a transaction task which requires the preparation of a form document, the Forms Integration Manager 3 unit accepts the agent's input selection of the desired form document and may partially completes the form document by using the information stored in the Participant Table 21(*a*) and Property Table 21(*b*). Next, the Forms Integration Manager 3 unit displays, in a window over the Gantt Chart 7, the form document associated to the selected task. The agent may then complete the document, and the Transaction Manager 2 unit accepts the agent's selection to send the document to the other agent and displays the document on the other agent's display device. At this point, the Gantt Chart Generator 6 automatically updates the Gantt Chart 7 indicating that the transaction task has been completed. The completed document is then stored in the Transaction Folder Table 9. A more detailed description of this process is presented in connection with FIG. 6.

A Transaction History 8 module is provided in order to permit the agents to update the status of transaction tasks that do not involve the completion of a form document or a vendor order form. For example, if the buyer's agent has completed a "Buyer Walk-Through Inspection" of the property with the buyer, the agent is prompted to use the Transaction History 8 module, which displays a "Task History" screen to the agent which is used to update the status of the walk through transaction task to "completed" and input the date completed. The Gantt Chart 7 is then automatically updated to reflect the new status of the transaction task.

Another important feature of the present invention is that a complete record of the entire real estate transaction is maintained and stored by the Transaction Manager 2 unit in the Transaction Folder Table 9. More specifically, for each real estate transaction involving a parcel of real property, the Transaction Manager 2 unit obtains from the Transaction Tables 21 (i.e., Participant Table 21(*a*), Property Table 21(*b*), and Transaction Tasks Table 21(*c*)) and stores in the Transaction Folder Table 9, the identity of all of the participants (e.g., buyer, seller, agents, and vendors), a description of the property, a list of all of the transaction tasks, the historical status of each transaction task, and each form document and vendor order form that was completed by the agents.

When the Gantt Chart 7 indicates that all transaction tasks have been completed, a Pre-Closing Report Generator 10 uses the information stored in the Transaction Folder Table 9 to generate a pre-closing report which summarizes the entire transaction history, and indicates whether the transaction tasks were completed on time and whether the transaction is in a condition to be closed. At the same time, the Pre-Closing Report Generator 10 generates a seller's and buyer's closing statement utilizing the financial information extracted from the purchase and sale agreement.

Figure 4:
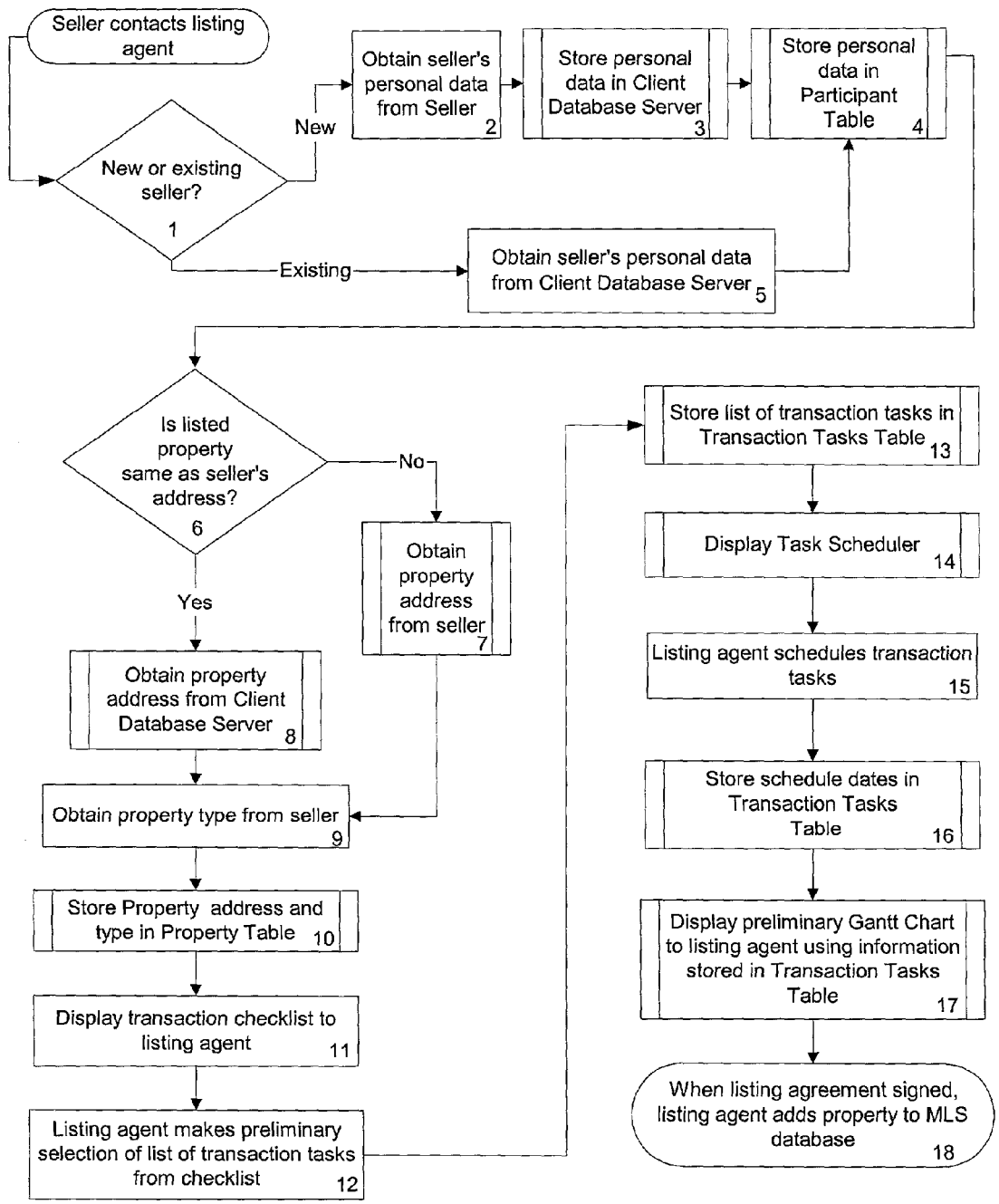
FIG. 4 is a flow chart which generally illustrates the manner in which a listing agent uses the present invention.
Figure 5:
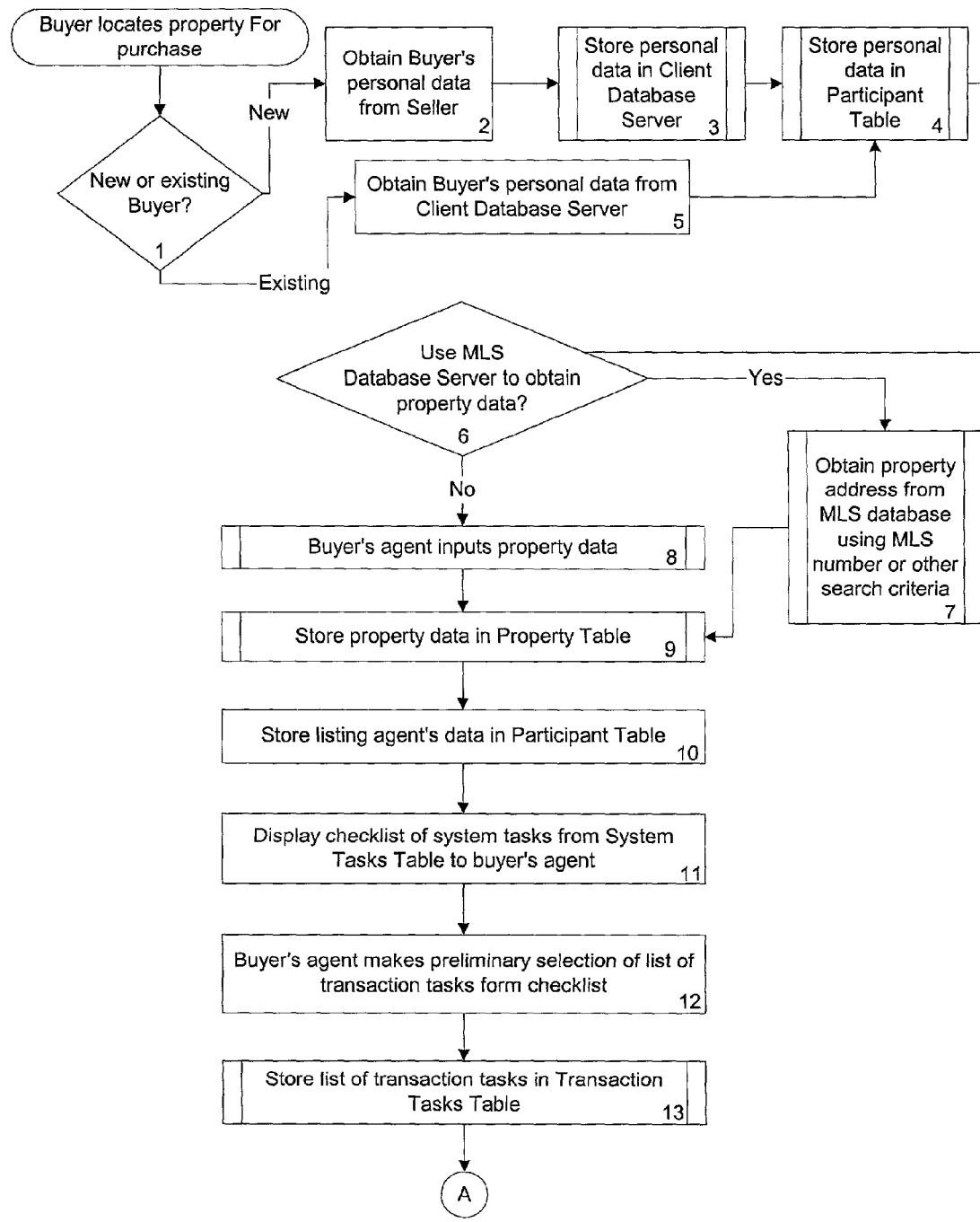
FIG. 5 is flow chart which generally illustrates the manner in which a buyer's agent uses the present invention, and the manner in which the listing agent and buyer's agent use the invention to negotiate a purchase and sale agreement and to create a consolidated Gantt Chart.
Figure 5:
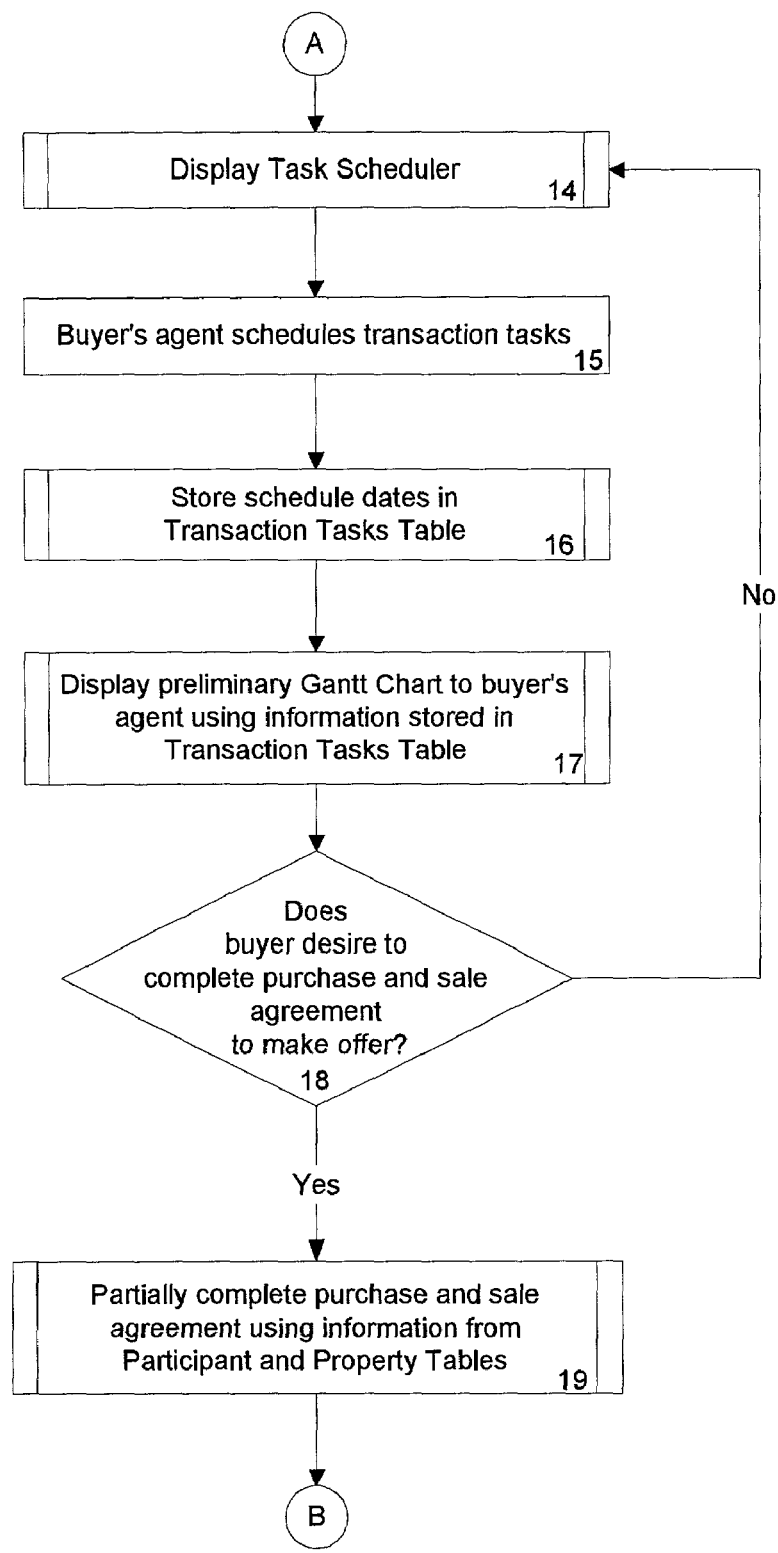
Figure 5:
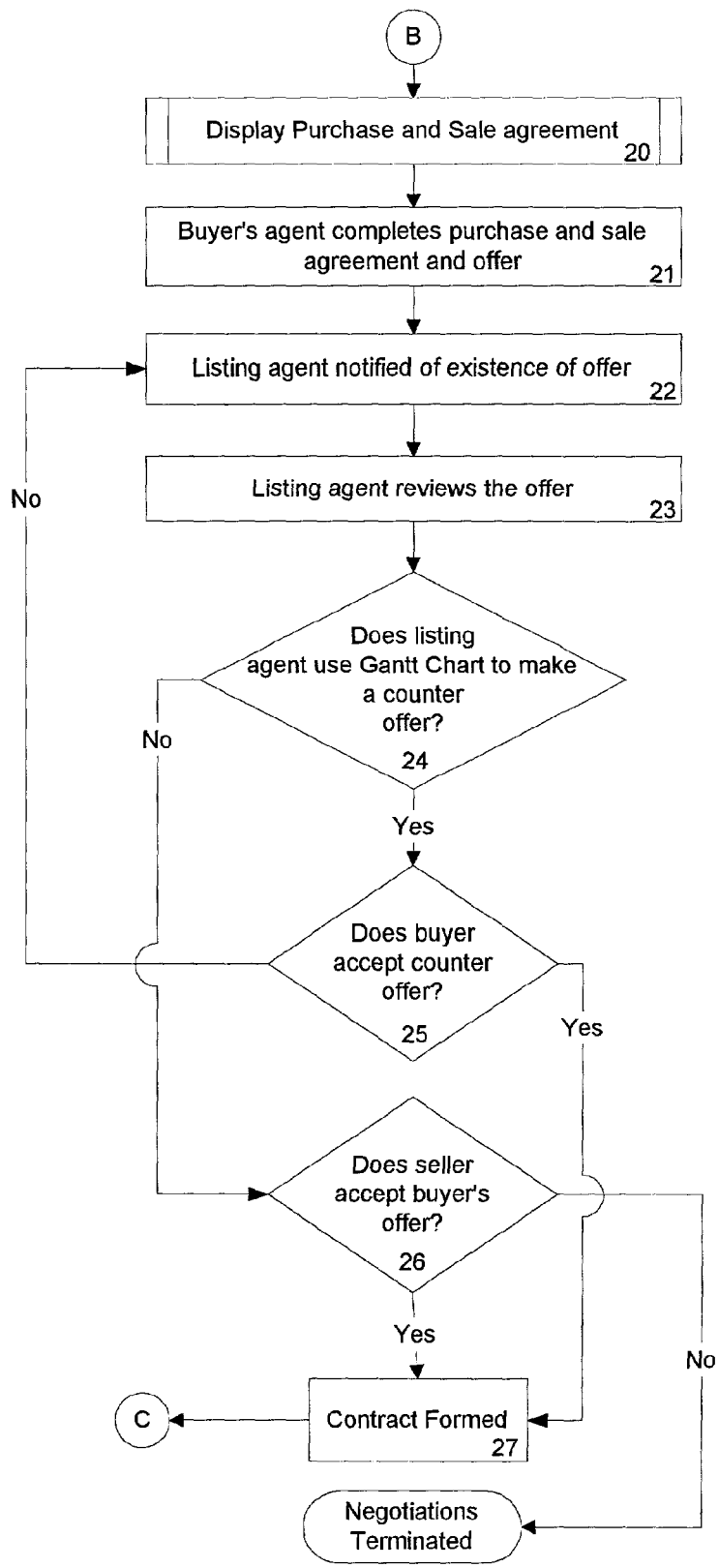
Figure 5:
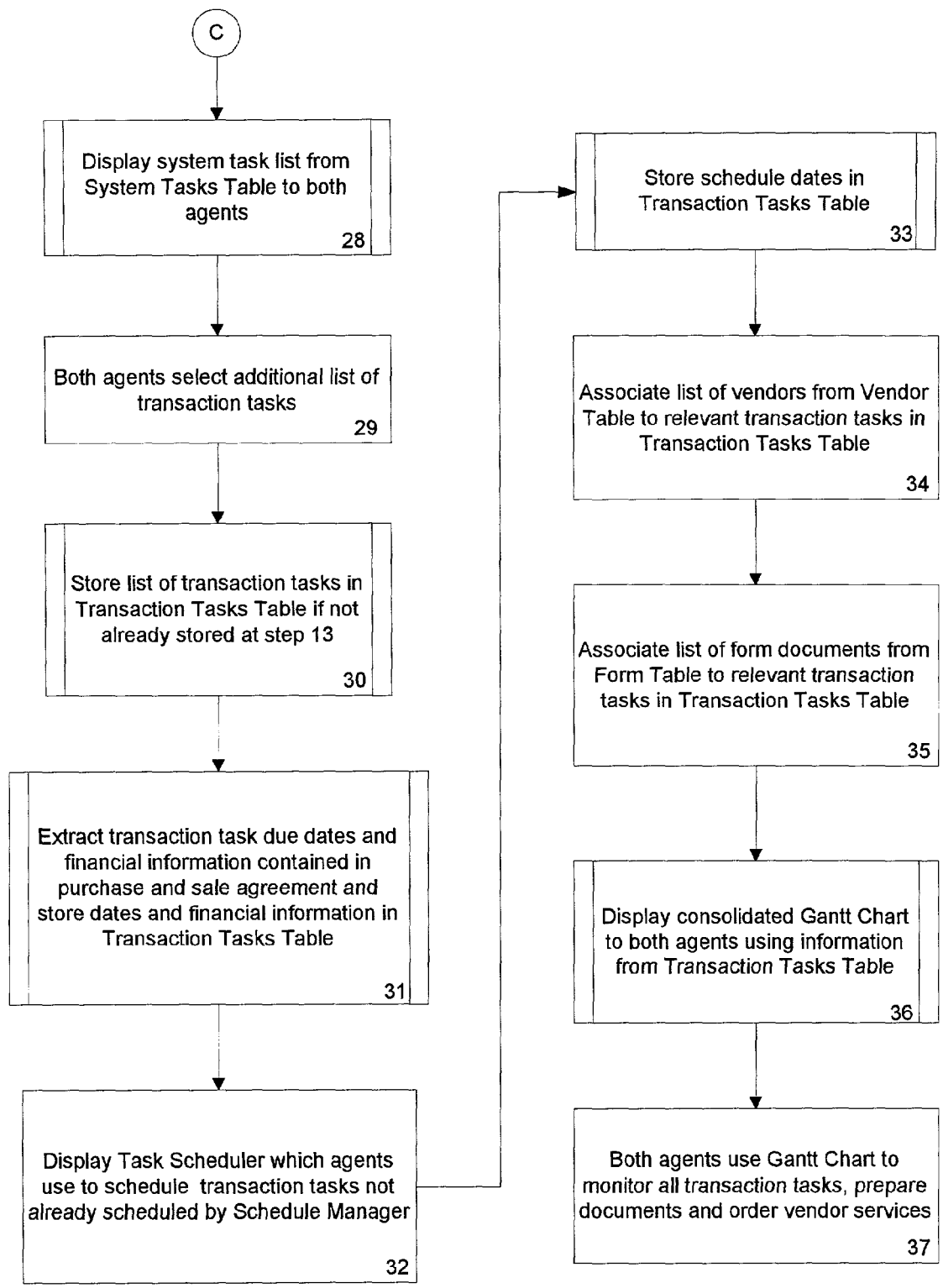

The manner in which the listing agent and buyer's agent use their respective client computers to access and interact with the System and Transaction Server 1 in order to manage the purchase and sale of a listed property is illustrated in more detail in FIGS. 4 and 5. FIG. 4 illustrates a purchase and sale transaction from the perspective of the listing agent. As in most real estate purchase and sale transactions, the process of the present invention commences with a seller contacting a listing agent for the purpose of having the seller's property listed for sale. The listing agent accesses the System and Transaction Server 1 using his or her client computer's data entry device, such as a keyboard and monitor, and inputs a pre-authorized password. Once authorized, the agent at step 1 is prompted by the Client Manager 14 unit to indicate, using the data entry device, whether the seller is a new or existing client. If the seller is new, the Client Manager 14 unit, at step 2, prompts the listing agent to obtain the seller's personal and contact information (i.e., name, residence address, mailing address, email address and other contact information) and other personal information. At step 3, the Client Manager 14 unit stores the seller's personal and contact information in the Client Database Server 22, and at step 4, in the Participant Table 21(*a*). If the seller is an existing client, at step 5, the Client Manager 14 unit obtains the seller's personal information from the Client Database Server 22 and the information is stored in the Participant Table 21(*a*). If the seller's residence address is the same as the property to be listed for sale, as determined at step 6, the Client Manager 14 unit obtains the listed property address, at step 8, from the Client Database Server 22. If the seller is not selling his or her residence, the listed property address is inputted at step 7 by the listing agent. At step 9, the listing agent inputs property type information (e.g., single family residence, condominium, multi-family, or land) obtained from the seller and from a physical inspection, and the Transaction Manager 2 unit, at step 10, stores the property information in the Transaction Property Table 21(*b*).

At step 11, the System Tasks Generator 15 displays a transaction checklist containing the list of system tasks from the System Tasks Table 20(*c*) to the listing agent. The listing agent, at step 12, is prompted to make a preliminary selection of a list of transaction tasks from the checklist, and at step 13, the preliminary list of transaction tasks is stored in the Transaction Tasks Table 21(*c*). At step 14, the Schedule Manager 4 unit displays a Task Scheduler to the listing agent, which the agent uses, at step 15, to schedule the start date and due date for each preliminary transaction task which has been selected. At step 16, the Transaction Manager 2 unit stores the preliminary transaction task schedule dates in the Transaction Tasks Table 21(*c*). Then, at step 17, the Gantt Chart Generator 6 displays a listing agent's preliminary Gantt Chart 7 to the listing agent on his or her display device by utilizing the information stored in memory in the Transaction Tasks Table 21(*c*). When a listing agreement is signed by the seller, the listing agent at step 18 adds the seller's property to the MLS Database 25. The listing agent and seller are now ready to receive an offer to purchase the listed property from a prospective seller.

FIG. 5 illustrates the present invention from the perspective of the buyer's agent who represents a buyer who desires to make an offer to purchase seller's listed property. The buyer's agent uses his or her client computer system to access the System and Transaction Server 1 and inputs a password using a data entry device, such as a keyboard and monitor. The agent at step 1 is then prompted by the Client Manager 14 unit to indicate, by using the data entry device, whether the buyer is a new or existing client. If the buyer is new, the Client Manager 14 unit, at step 2, prompts the buyer's agent to obtain the buyer's personal and contact information (i.e., name, residence address, mailing address, email addresses and other personal information). At step 3, the Client Manager 14 unit stores the personal and contact information in the Client Database Server 22, and at step 4, in the Participant Table 21(*a*). If the client is an existing client, at step 5, the Client Manager 14 unit obtains the buyer's personal information from the Client Database Server 22, and it is similarly stored in the Participant Table 21(*a*). At step 6, the Client Manager 14 unit prompts the agent to indicate whether the MLS Database Server 25 will be used to obtain a complete description of the property and the identity and contact information about the seller and listing agent. If it is, at step 7, the Transaction Manager 2 unit prompts the agent to identify the MLS number or the property address, and a description of the property is obtained from the MLS Database 25 and at step 9 is stored in the Property Table 21(*b*). The identity of the seller and listing agent and contact information are also obtained from the MLS Database 25 and, at step 10, are stored in the Participant Table 21(*a*). Otherwise, the agent obtains the information from the buyer or other sources, and inputs the data into the Server 1 at step 8 and it is similarly stored in the Property Table 21(*b*) at step 9 and Participant Table 21(*a*) at step 10, unless the information has already been obtained form the listing agent.

Once the participant's information and property description have been stored in the Transaction Tables, the System Tasks Generator 15, at step 11, displays a transaction checklist containing a list of system tasks to the buyer's agent. At step 12, the checklist prompts the buyer's agent to make a preliminary selection of a list of transaction tasks from the checklist that may need to be performed in order to consummate the buyer's purchase. At step 13, the list of preliminary transaction tasks are stored in the Transaction Tasks Table 21(*c*).

At step 14, the Schedule Manager 4 unit displays the Task Scheduler screen to the buyer's agent, which prompts the agent at step 15, to schedule the start date and due date for each transaction task which has been selected. At step 16, the schedule dates are then stored in the Transaction Tasks Table 21(*c*) and associated to the applicable preliminary transaction task. And, at step 17, the Transaction Manager 2 unit retrieves the data stored in the Transaction Tasks Table 21(*c*) and the Gantt Chart Generator 6 displays a buyer's agent's preliminary Gantt Chart 7 to the buyer's agent on his or her display device.

At this point, the buyer's agent's preliminary Gantt Chart 7 displays on the buyer's agent's display device the preliminary transaction tasks that the agent believes should be performed in anticipation of the buyer entering into a purchase and sale agreement with the seller. Similarly, the listing agent's preliminary Gantt Chart 7 displays on the listing agent's display device the preliminary transaction tasks that the agent would normally perform prior to listing a property for sale. As will be more specifically described in connection with FIG. 12, which represents a sample Gantt Chart 7, each agent is now able to use their respective preliminary Gantt Chart 7 in order to monitor transaction tasks, obtain access to form real estate documents, and order vendor services.

Next, the buyer's agent determines at step 18 whether his or her client desires to complete a purchase and sale agreement in order to make an offer to buy the property previously identified by the buyer. If the buyer decides not to proceed, the Transaction Manager 2 unit returns control to the Task Scheduler screen. If the buyer elects to proceed with an offer, at step 19, the buyer's agent clicks on the "paper clip" icon adjacent to the transaction task which requires the completion of a sale and purchase agreement (e.g., "Purchase Agreement"). The Forms Integration Manager 3 unit obtains the information stored in the Participant and Property Tables, 21(*a*) and 21(*b*), respectively, in order to partially complete the purchase and sale agreement, which is then displayed to the buyer's agent at step 20. At step 21, the buyer's agent completes the purchase and sale agreement in consultation with the buyer, who, in a preferred embodiment, signs the offer electronically. At step 22, the Transaction Manager 2 unit notifies listing agent of the offer by displaying the completed purchase and sale agreement in a window over the listing agent's Gantt Chart. At step 23, the listing agent reviews the offer. At step 24, the listing agent, in consultation with the seller, decides whether to accept or reject the buyer's offer or to make a counteroffer. If at step 26, the seller accepts the buyer's offer by signing the offer electronically, then a contact is formed at step 27. If the offer is rejected and no counteroffer is made, negotiations are terminated. If at step 26 a counteroffer is made, the listing agent either uses the purchase and sale agreement to make the counteroffer, or, the listing agent uses the Gantt Chart 7 to obtain and complete a counteroffer form document which has been previously associated to the corresponding system task. The Transaction Manager 2 unit notifies the buyer's agent that a counteroffer has been made by displaying the counteroffer in a window over the buyer's Gantt Chart. At step 25, the buyer's agent in consultation with the buyer decides whether to accept the counteroffer from seller. If the counteroffer is accepted, a contract is formed at step 27. If the seller's counteroffer is rejected and buyer and seller decide to continue negotiating, steps 22 through 25 are repeated until either a contract is formed, or the buyer, at step 22, or seller, at step 26, decide to terminate the negotiations.

After the agents have successfully negotiated a purchase and sale agreement, at step 28, the System Tasks Generator 15 again generates and displays the transaction checklist containing the list of system tasks from the System Tasks Table 20(*c*) and prompts the agents at step 29 to select the list of additional transaction tasks that must be performed in order to satisfy the terms and conditions of the purchase and sale agreement. At step 30, the Transaction Manager 2 unit stores the list of additional transaction tasks in the Transaction Tasks Table 21(*c*), if not already stored at step 13. At step 31, the Transaction Manager 2 unit identifies each field within the purchase and sale agreement which contains due dates that need to be monitored on the Gantt Chart 7 and financial information that needs to be transferred to a seller's and a buyer's closing statement. After each field is identified, the Schedule Manager 4 unit extracts each start date and a due date by which a transaction task must be completed as provided for in the purchase and sale agreement, and stores the due dates in the Transaction Tasks Table 21(*c*). Then at step 32, the Schedule Manager 4 unit displays the Task Scheduler screen to both agents, which they use to schedule start dates and due dates for the completion of transaction tasks that have not already been scheduled. Then, at step 33, the Transaction Manager 2 unit stores all due dates, not previously stored, in the Transaction Tasks Table 21(*c*).

At step 34, the Vendor Manager 5 unit associates each vendor within a list of vendors from the Vendor Table 20(*b*) to a corresponding transaction task in the Transaction Tasks Table 21(*c*). Similarly, at step 35, the Forms Integration Manager 3 unit associates each form document from a list of form documents from the Forms Table 20(*a*) to a corresponding transaction task in the Transaction Tasks Table 21(*c*). Finally, at step 36, the Gantt Chart Generator 6 generates and displays a consolidated Gantt Chart 7 to both agents using the transaction tasks and dates stored in the Transaction Tasks Table 21(*c*), and at step 37, both agents are now able to use the same Gantt Chart to monitor the transaction tasks, prepare documents, and order vendor services.

Periodically, and no less than daily, the Transaction Manager 2 unit determines if the Gantt Chart 7 indicates that all of the transaction tasks have been completed and whether the tasks have been completed on time. As each transaction task is completed, all of the information about the task stored in the Transaction Tasks Table 21(*c*) and information obtained from the Task History 8 module are stored in the Transaction Folder Table 9. If some tasks still are not complete, the Transaction Manager 2 unit continues to monitor the Chart 7. If all tasks have been completed, the Pre-Closing Report Generator 10, using the information stored in the Transaction Folder Table 9 generates a Pre-Closing Report, which indicates whether each transaction task have been completed timely and whether the transaction is in a condition to be closed.

Figure 6:
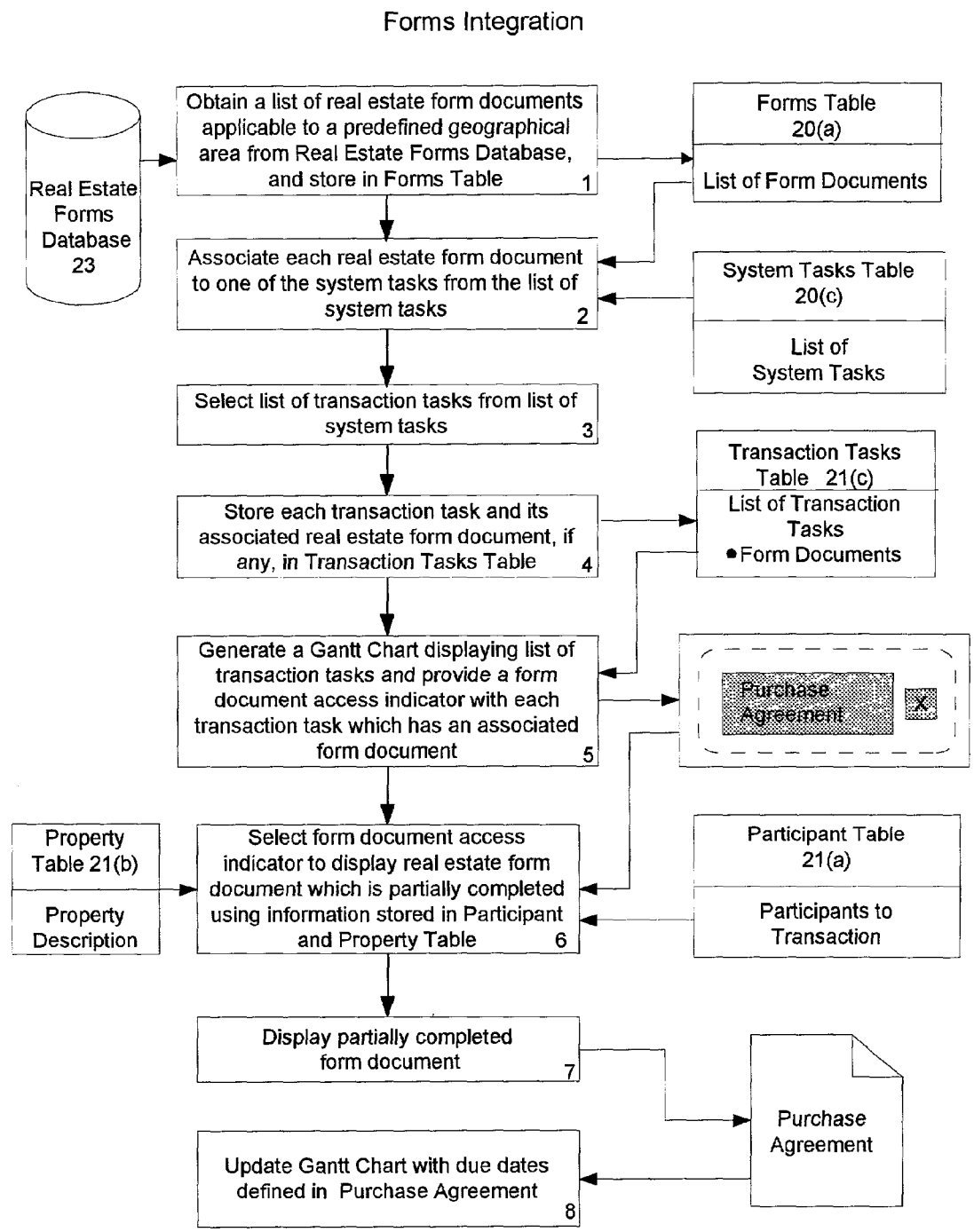
FIG. 6 is a flow chart which illustrates the manner in which the present invention integrates real estate form documents into the Gantt Chart.

An important feature of the present invention is its ability to use standard real estate form documents that have been adopted by local real estate boards for use within the board's geographical area and to access the form documents while using the Gantt Chart to monitor a transaction. FIG. 6 illustrates this important feature in more detail, and although the example that is described pertains to the integration of form documents into a preliminary Gantt Chart 7, the process described is equally applicable to the integration of form documents into a consolidated Gantt Chart 7. Turning to the figure, as illustrated in FIG. 6, once the location of the listed property has been identified and the location stored in the Property Table 21(*b*), the Transaction Manager 2 unit, at step 1, obtains the property location from the Property Table 21(*b*) and searches the Real Estate Forms Database 23 in order to obtain a list of system form documents that have been identified for use in the applicable location, and stores the forms in the Forms Table 20(*a*). The Forms Integration Manager 3 unit, at step 2, associates each form document in the Forms Table 20(*a*) to a system task in the System Tasks Table 20(*c*) by matching the form document that is needed to perform a task to the appropriate system task. At step 3, the System Tasks Generator 15 accepts input from the agents which identifies and selects a list of preliminary transaction tasks, from the list of system tasks which causes form documents to be simultaneously associated with appropriate transaction tasks. Then, at step 4, each transaction task and its associated real estate form document, if any, is stored by the Forms Integration Manager 3 in the Transaction Tasks Table 21(*c*). Using the data stored in the Transaction Tasks Table 21(*c*), the Gantt Chart Generator 6, at step 5, generates and displays a preliminary Gantt Chart 7 to the agents, which provides a form document access indicator (e.g., "paper clip" icon) adjacent to each transaction task which requires the completion of a form document. At the same time that the form documents are associated or matched to a transaction task, the Forms Integration Manager 3 unit also partially completes the documents using the information stored in the Participant Table 21(*a*) and Property Table 21(*b*). FIG. 6 illustrates this process as it applies to a form "Purchase Agreement" and an "x" mark on figure denotes that the form has been associated or matched with the appropriate transaction task and that the form has been populated with the information from the Transaction Tables 21. The agents may now, at step 6, view the partially completed form documents by clicking on the "paper clip" icon, represented by the "x," adjacent to the relevant transaction task title (i.e., "Purchase Agreement") on the Gantt Chart, and at step 7, the document is displayed in a window over the Gantt Chart. Finally, at step 8, the Schedule Manager 4 unit extracts the start dates and due dates from the "Purchase Agreement," which are stored in the Transaction Tasks Table 21(*c*), and are then used by the Gantt Chart Generator 6 to display a schedule bar, extending from a start date to a due date, for each scheduled transaction task.

Figure 7:
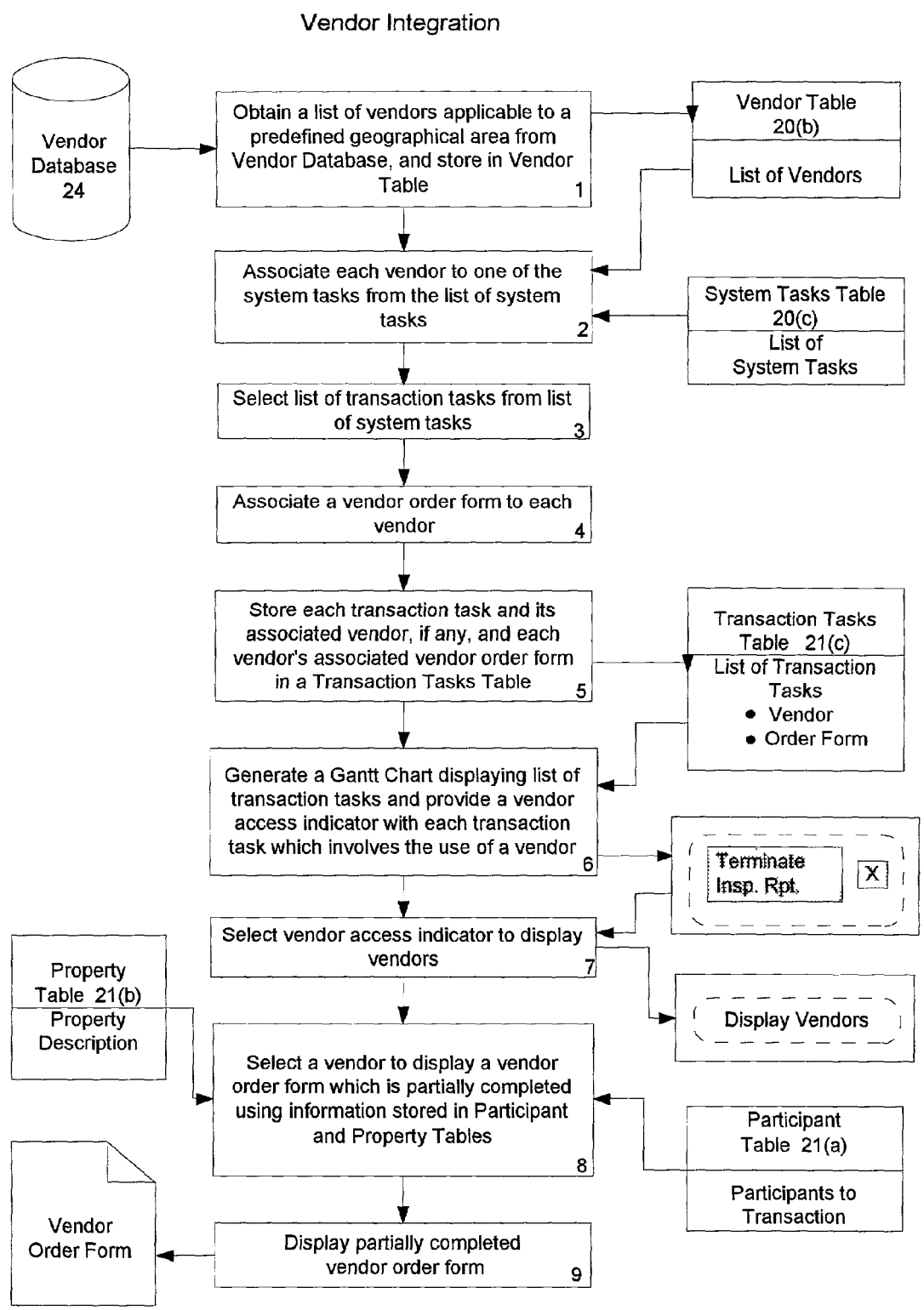
FIG. 7 is a flow chart which illustrates the manner in which the present invention integrates vendors and vendor order forms into the Gantt Chart.
Figure 8:
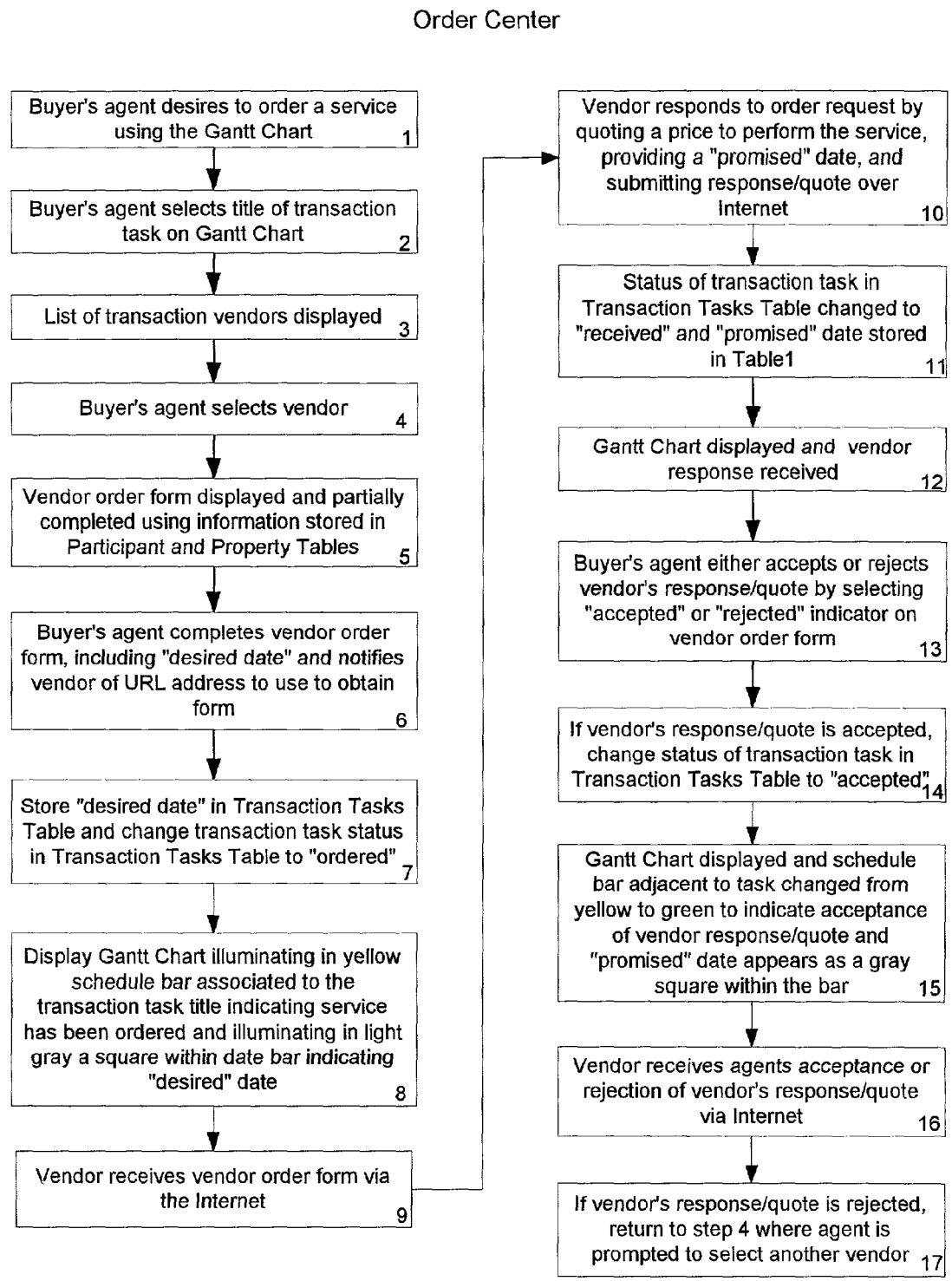
FIG. 8 is a flow chart which illustrates the manner in which a real estate agent uses the Gantt Chart to order a desired vendor service.

Another important aspect of the present invention is that the agents are able to use the Gantt Chart 7 to order the vendor services that are needed to perform certain transaction tasks. FIG. 7 illustrates the manner in which the vendor service function is integrated with the Gantt Chart 7 and FIG. 8 illustrates the manner in which the agents use the Gantt Chart 7 to order services from the vendor. Both figures are applicable to either a preliminary or a consolidated Gantt Chart 7. At step 1 in FIG. 7, the Transaction Manager 2 unit obtains, from the Vendor Database 24, a list of vendors who are available to provide services within the geographical area of the transaction, and stores the vendors in the Vendor Table 20(*b*). At step 2, the Vendor Manager 5 unit associates each vendor stored in the Vendor Table 20(*b*) with one of the system tasks from the list of system tasks from the list of system tasks stored in the System Tasks Tables 20(*c*). At step 3, the agents are prompted to select a list of transaction tasks from the list of system tasks and at step 4, a vendor order form is associated with each vendor. At step 5, the Vendor Manager 5 unit stores the transaction tasks and each transaction task's associated task vendor, if any, and each vendor's order form in the Transaction Tasks Table 21(c). A Gantt Chart 7, generated by the Gantt Chart Generator 6, displays at step 6, a list of transaction tasks which require the use of a vendor service (e.g., "Termite Insp. Rpt."), and adjacent to each such task is a vendor access indicator or vendor icon, shown in the figure as an "x." At step 7, the agents are prompted to use the vendor icon in order to obtain a display over the Gantt Chart 7 of each vendor who is available to provide the service. When a task vendor is selected at step 8, the Order Manager 17 unit accepts the selection and displays, at step 9, a vendor order form which is partially completed by the Order Manager 17 unit using the information stored in the Participant Table 21(a) and Property Table 21(b). The agent then completes the vendor order form and the Order Manager 17 unit notifies the vendor that the vendor order is available for review and response.

FIG. 8 illustrates in more detail the manner in which the real estate agents use the Gantt Chart to select vendors and to place orders for the services that are needed to close the transaction. Although, the figure describes a buyer's agent who is ordering a service, the description is equally applicable to a listing agent. At step 1, the buyer's agent recognizes the need to order a service (e.g., termite inspection), and at step 2, the agent clicks on or selects the appropriate transaction task title displayed on the Gantt Chart (e.g., "Termite Insp. Rpt."). At step 3, the Vendor Manager 5 unit accepts the buyer's agent's selection and displays the vendors to the agent. At step 4, the buyer's agent selects the task vendor he or she wants to use to perform the transaction task and its corresponding vendor service. At step 5, the Order Manager 17 accepts the buyer's agent's selection and automatically, partially completes an order form using the information stored in the Participant Table 21(a) and Property Table 21(b) and displays the order form to the agent. The order form is partially completed by identifying a unique identifier to each blank field within the form and matching the identifier to the same identifier associated to information in the Tables. At step 6, the agent electronically completes the order form and inputs a "desired" date for completion of the service. The agent submits the vendor order to the task vendor by sending to the vendor, via email, the URL address of the order form page, enabling the vendor to access the vendor order form using a browser. At the same time, at step 7, the Vendor Manager 5 unit stores the "desired" date in the Transaction Tasks Table 21(c), associates the "desired" date to the transaction task in the table, and changes the status of the task to "pending." At step 8, the Gantt Chart 7 is displayed to the agent. The Chart 7 indicates that the task has been ordered by changing the green schedule bar to yellow and by illuminating in light gray a square within the date bar corresponding to the "desired" date. The task vendor receives the vendor order form via the Internet, at step 9. At step 10, the task vendor is prompted to respond to the order request by quoting a price to perform the service, providing a "promised" date, and submitting the response/quote to the buyer's agent over the Internet. At step 11, the Order Manager 17 unit updates the status of the transaction task (i.e., "Pest Control Inspection") to "received" in the Transaction Tasks Table 21(c) and the "promised" date is also stored in the Table 21(c). The Gantt Chart 7 is displayed at step 12 and the vendor's response/quote is displayed in a window over the Gantt Chart 7. At step 13, the buyer's agent, on behalf of his or her client, either accepts or rejects the vendor's response/quote by clicking on "accepted" or "rejected" on the vendor form. If, at step 14, the vendor's response/quote is accepted, the Order Manager 17 unit changes the status of the transaction task in the Transaction Tasks Table 21(c) to "accepted." At step 15, the Gantt Chart Generator 6 displays the Gantt Chart and automatically updates the date bar adjacent to the transaction task by changing its color from yellow back to green to indicate that the vendor's response/quote has been accepted and the "promised" date appears as a gray square within the bar. At step 16, the vendor receives notice of the agent's acceptance or rejection of vendor's response/quote via the Internet. If at step 17 the vendor's response/quote is rejected, the Order Manager 17 unit returns the agent to step 4 where the list of transaction vendors is again displayed, prompting the agent to select another vendor.

FIG. 9 illustrates the organizational structure of the System Tables 20. Forms Table 20(a) contains a list of form documents that the agents might need to use in order to close a real estate transaction within the geographical area of the local real estate board where the listed property is located. Each form document stored in the table has an associated form name, form number which corresponds to a task number in the System Tasks Table 20(c), task title which corresponds to the transaction task title display on the Gantt Chart, property location description which corresponds to a geographical area where use of the form has been approved by the local real estate board, property type description which is used to select the appropriate form, and a buyer and/or seller designation which indicates whether the buyer and/or the seller is entitled to access the document. The Vendor Table 20(b) contains the identity of a list of system vendors that the agents may use to obtain services within the same geographical area where the listed property is located. Each vendor within the table is also associated with a vendor name, vendor number which corresponds to a task number in the System Tasks Table 20(c), task title which corresponds to the transaction task title display on the Gantt Chart, property location which corresponds to a geographical area where the vendor provides services, and vendor order form number which corresponds to the order form to be used to order vendor services. The System Tasks Table 20(c) contains an example of a complete list of the system tasks, defined by the system administrator, that the agents may have to perform in order to close a real estate transaction within the geographical area of a specific local real estate board where the listed property is located. Each task within the table is assigned a unique system task number which is used, if necessary, to associate a task with a form document or a vendor. Each task is further identified by an abbreviated name or title which is used by the Gantt Chart Generator 6 to display a list of transaction tasks on the Gantt Chart, and is identified by a full task name or title which is used by the Transaction Manager 2 unit in order to generate a pre-closing report, and buyer and seller closing statements.

FIG. 10 illustrates the organizational structure of the Transaction Tables 21. Participant Table 21(a) contains the name and contact information for the listing agent, buyer's agent, seller, buyer and for each vendor who has agreed to perform services for a specific transaction. The Property Table 21(b) contains the address of the listed property, the legal description, listed price, type of property, foundation type, basement description, lock box code, year built, home style, and attic description. The Transaction Tasks Table 21(c) contains, for each system task identified by the agents as a transaction task that must be completed, a transaction task name (abbreviated and full) and a transaction task number, each of which is identical to the corresponding system task name and number, a form number which corresponds to the form document associated with the task, a vendor number which corresponds to each vendor that is available to perform the task, and a transaction number which corresponds to the real estate transaction that is being managed and is used to identify and store all of the information contained in the Transaction Tasks Table 21(c) in the Transaction Folder Table 9. For each transaction task, Table 21(c) also contains the dates which correspond to the schedule dates for each transaction task: "Start," "Due," "Desired," "Promised," and "Completed." Lastly, the Table stores the status of each task as being "On Time," "Pending," "Received," "Accepted" or "Rejected."

Figure 11:
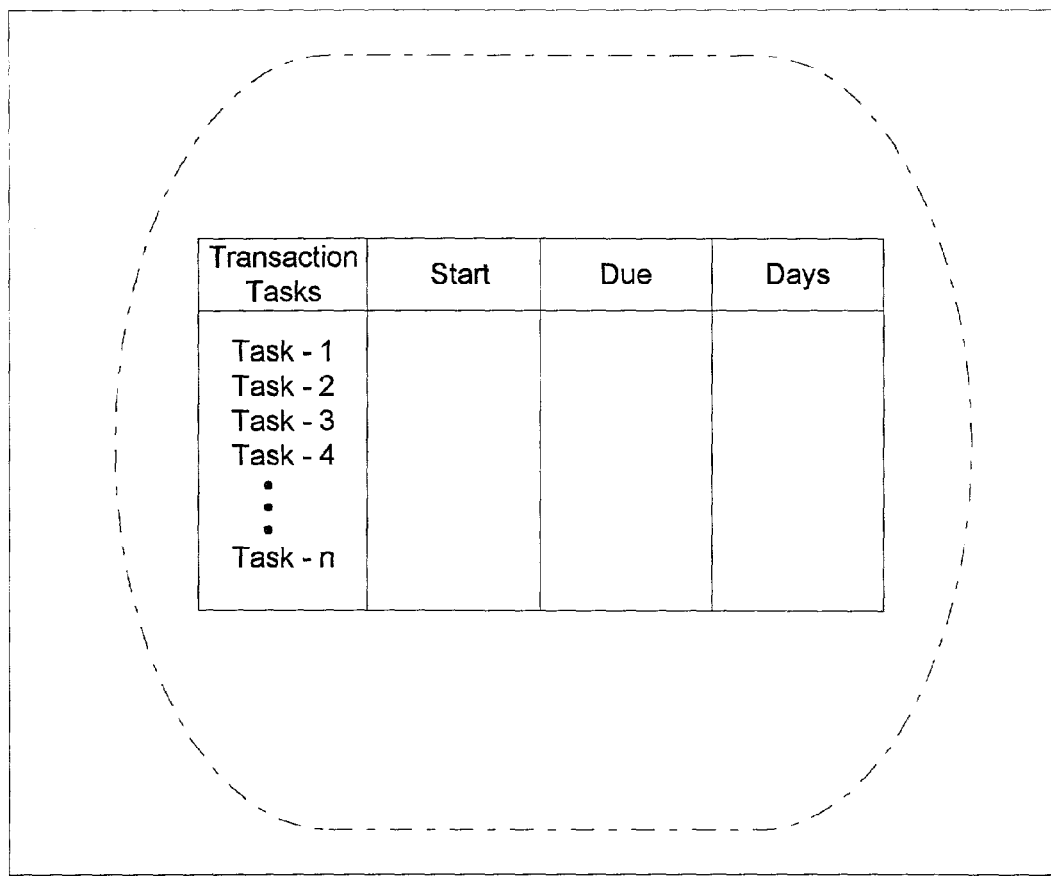
FIG. 11 diagrammatically illustrates a Task Scheduler screen which the real estate agents use to schedule transaction tasks.

FIG. 11 is a diagram which illustrates the Task Scheduler screen which is displayed to both agents by the Schedule Manager 4 unit. This screen is displayed to the agents whenever they desire to schedule transaction task dates, which either have not already been automatically scheduled by the Schedule Manager 4 unit after a purchase and sale agreement has been entered into, or are unrelated to the dates established in the agreement. The task schedule established by the Schedule Manager 4 unit and by the agents using the Task Scheduler screen defines a "start" date and "due" date for each transaction task, and the Gantt Chart Generator 6 illuminates in green the rectangular schedule bar which extends horizontally access the Gantt Chart between the two dates and is adjacent to each corresponding transaction task title on the Gantt Chart 7. The Task Scheduler screen also allows the agents to enter the number of days by which a task must be completed, and the Schedule Manager 4 unit determines the "due" date.

FIG. 12 is a diagrammatic illustration of a Gantt Chart 7, which has been generated by the Gantt Chart Generator 6 in connection with a sample real estate transaction. The figure will be utilized to describe the agent's interaction with both the preliminary and the consolidated Gantt Charts, since the agents use each chart in the same manner to monitor and perform tasks. The Gantt Chart 7 displays a list of transaction tasks in a column along the left side of the Chart 7, and each transaction task is given a task name or title (e.g., "Purchase Agreement," and "Termite Insp. Rpt."). Adjacent to some transaction task titles is a form document access indicator or icon in the shape of a "paper clip," which indicates that a form document has been associated or attached to the adjacent transaction task. A horizontal, rectangular, schedule bar, adjacent to each transaction task, contains a time line of consecutive calendar dates, and within each time line certain dates are highlighted to alert the agents concerning certain important dates. When the Gantt Chart 7 is displayed to the agent, the schedule bar for each transaction task that has been scheduled by the Schedule Manager 4 unit or by the agents using the Task Scheduler screen is illuminated in green extending from the "start" date to the "due" date. Completion of a task on a date falling within the green schedule bar would be "on time" as indicated on the Gantt Chart color legend. Any task that is not completed on time is identified by illuminating the appropriate date or dates within the schedule bar in red for each day the task is late.

An important feature of the present invention is that each agent interacts with the Gantt Chart 7 to access and complete documents, and as they do so the Gantt Chart is automatically updated. Initially the agents interact with a preliminary Gantt Chart 7 after they have scheduled the start date and due date for each preliminary transaction task. Since the manner in which each agent interacts with the preliminary Gantt Chart 7 is the same, only the buyer's agent's interaction with his or her preliminary Gantt Chart 7 is described in detail, but it will be understood that the description is equally applicable to the listing agent's interaction with his or her preliminary Gantt Chart 7. After the preliminary transaction tasks have been scheduled by the buyer's agent and the preliminary Gantt Chart is displayed to the agent, each "paper clip" icon is illuminated, indicating that the associated form document may be viewed and downloaded by the agent. With regard to unmodified form documents (e.g., "Buyers Inspection Advisory") that are provided to the buyer by the buyer's agent (or provided to the seller by the listing agent), the agent clicks on the "paper clip" icon associated with the transaction task name or title (e.g., Buyer's Insp. Adv.) which is associated with the desired form document and the document is displayed to the agent in a window over the Gantt Chart 7. The buyer's agent may then provide the document to the buyer by either downloading the document or emailing the document to the client. The Transaction Manager 2 unit is programmed to recognize that the document was downloaded or emailed and the Manager 2 notifies the Gantt Chart Generator 6 of the change in the status of the document which causes the Gantt Chart Generator 6 to automatically update the Gantt Chart 7 to indicate that the task of providing the unmodified form document to the buyer has been completed on or before the due date by inserting a black square within the green bar associated with the appropriate transaction task, and at the time and on the date corresponding to the date on which the document was provided to the buyer. If the document is not provided to the buyer on or before the due date, for each date that the task is late the Gantt Chart Generator 6 extends the schedule bar by an additional date and illuminates a red square within the schedule bar. The Gantt Chart Generator 6 continues to add additional red squares within the extended schedule bar until the buyer's agent provides the form document to the buyer, at which time a black square is displayed at the end of the schedule bar, indicating that the task has been completed.

If the form document must be completed in some manner before it is provided to by the buyer's agent to the buyer (or by the listing agent to the seller), when the agent selects the icon associated with the desired document, the Transaction Manager 2 unit notifies the Form Integration Manager 3 unit of the agent's selection and the Forms Integration Manager 3 unit retrieves the information stored in the Participant Table 21(a) and Property Table 21(b) and uses it to automatically complete a portion of the document. The document is then displayed to the agent. If the document requires additional input from the agent, the agent completes the document on the display device. When the document is completed, it is provided by the buyer's agent to the buyer (or by the listing agent to the seller) in the same manner that that the unmodified form document is sent. And, the Gantt Chart 7 is similarly automatically updated to indicate that the task is completed and whether the task was completed timely.

After the agents have successfully negotiated a purchase and sale agreement, as described above in connection with FIG. 5, they interact with the same consolidated Gantt Chart 7 which displays all of the preliminary and additional transaction tasks that the agents have identified as needing to be performed in order to close the transaction. With regard to the unmodified form documents that must be sent by a sending agent to a receiving agent (e.g., buyer's agent sending a form document to listing agent), the sending agent clicks on the "paper clip" icon associated with the additional transaction task which is associated with the desired form document (e.g., the "Real Estate Transfer Disclosure Statement" form document which is associated with the transaction task of the same name, which is identified in the System Tasks Table 20(c) as "System Task ID" number "68" on FIG. 9), and the Forms Integration Manager 3 unit accepts the agent's input selection of the desired form document and displays the document on the sending agent's display device in a window over the Gantt Chart 7. The sending agent is then prompted to select a "send" indicator on the Gantt Chart 7 which causes the Transaction Manager 2 unit to send the desired form document to the receiving agent, and to display the form document within a window over the Gantt Chart 7 being displayed to the receiving agent. If the receiving agent does not have the Gantt Chart open at the time the form document is sent, the document will be displayed the next time the receiving agent's Gantt Chart is displayed. Again, the Transaction Manager 2 unit then notifies the Gantt Chart Generator 6 of the change in the status of the document which causes the Gantt Chart Generator 6 to automatically update the Gantt Chart 7 to indicate that the sending agent's task of providing the form document to the receiving agent has been completed timely by inserting a black square within the green schedule bar associated with the appropriate transaction task, and at the time and on the date corresponding to the completion of the task. Again, however, if the task of providing the form document to the receiving agent is not performed on or before the due date, the Gantt Char Generator 6 automatically extends the schedule bar for each date the task is late and illuminates the date in red.

With regard to form documents that must be completed before the documents are sent to the receiving agent, the sending agent again clicks on the appropriate "paper clip" icon and, before the document is displayed, it is partially completed by the Forms Integration Manager 3 unit which uses the data stored in the Participant Table 21(a) and Property Table 21(b). The sending agent then may, or may not, need to complete the document on the screen and, when it is complete, selects the "send" function on the Gantt Chart 7 which automatically sends the document to the receiving agent. The Transaction Manager 2 unit again notifies the Gantt Chart Generator 6 of the change in the status of the document which causes the Gantt Chart Generator 6 to automatically update the Gantt Chart 7 to show that the sending agent's task of completing and providing the form document to the receiving agent has been timely completed by inserting a black square within the green schedule bar associated with the appropriate transaction task, and at the time and on the date corresponding to the completion of the task. If the task is completed late, the schedule bar is again illuminated in red.

Figure 13:
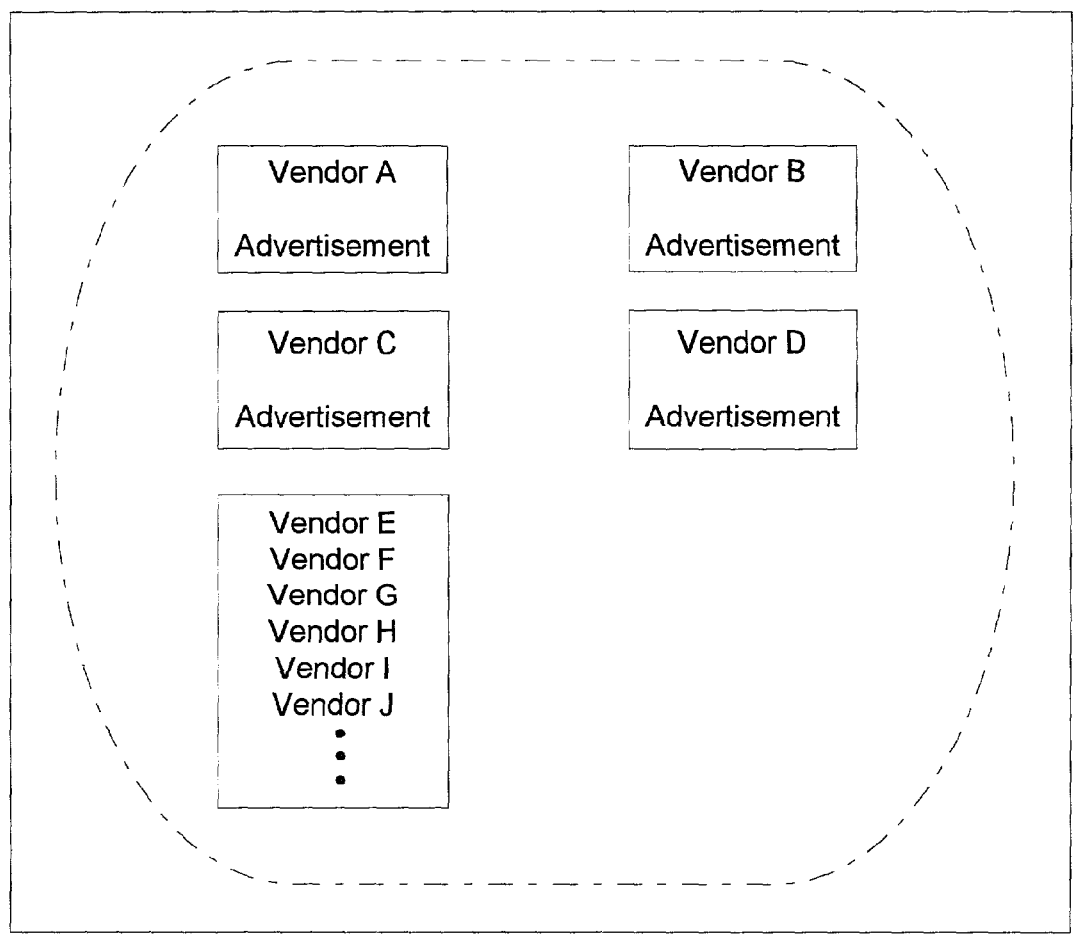
FIG. 13 diagrammatically illustrates a screen which displays a list of vendors to the real estate agents.

In addition to enabling the agents to use the Gantt Chart 7 to provide unmodified form documents and completed form documents to each other and to their clients, the present invention enables the agents to use the Gantt Chart 7 to obtain vendor services using a vendor order form. For example, if the buyer's agent has the responsibility under the purchase and sale agreement to obtain a termite inspection report from a pest control operator, the agent uses the Gantt Chart 7 by clicking on the name or title of the appropriate transaction task (i.e., "Termite Insp. Rpt.") which performs the function of the vendor access indicator or icon, and the Vendor Manager 5 unit displays a list of pest control operators which is obtained from the Transaction Tasks Table 21(c). FIG. 13 diagrammatically illustrates the manner in which the vendors are displayed to the agent. The agent selects the vendor he or she wants to use, and the Vendor Manager 5 unit accepts the agent's input selection and displays the vendor order form on the buyer's agent display device. At the same time, the vendor order form is partially completed by the Order Manager 17 unit using the data stored in the Participant Table 21(a) and Property Table 21(b). A sample vendor order form, which has been partially completed using the Tables, is presented in FIG. 14. The agent completes the order form, specifying among other things, a "desired" date for completion of the pest inspection and issuance of a pest control report which would normally correspond to the due date established in the purchase and sale agreement. Then the agent sends the order form to the pest control operator by selecting the "Send to Vendor" option on the display. At this point, the Order Manager 17 unit is programmed to recognize that the send option has been selected, and the Gantt Chart Generator 6 automatically updates the Gantt Chart to indicate the "desired" date for the service by placing a light gray square within the schedule bar, associated with the pest inspection transaction task, which corresponds to the date by which the pets control inspection service and report must be completed. The Gantt Chart Generator 6 also changes the color of the schedule bar from green to yellow to indicate that the order is "pending." The Order Manager 17 unit next generates an email message to the vendor, using the data stored in Transaction Tasks Table 21(c), in which the vendor is given the URL address of the page of the vendor order form and informing the vendor that the vendor order is available for review and response. The vendor is then able to view the vendor order on the vendor's computer display by using a browser and the URL address to display the page containing the order. The vendor responds to the order by providing a "promised" date and a quote to perform the service, and selects the "Send to Agent" option on the screen to submit the response to the agent. The Order Manager 17 unit automatically then displays the vendor order form, including the vendor's response and quote to the agent in a window over the Gantt Chart. The agent reviews the vendor's response and quote, and if it is acceptable, the agent, on behalf of his or her client, selects the "accepted" option on the display, and notifies the vendor that the vendor's quote has been accepted. At this point, the Gantt Chart Generator 6 again automatically updates the Gantt Chart 7 by changing the color of the date bar from yellow to green and by indicating the "promised" date on the green schedule bar by displaying a gray square within the schedule bar on the appropriate date. When the pest control operator completes the inspection, and provides a report to the agent, the agent uses the Task History screen, illustrated in FIG. 15, to update the transaction task status as "completed," identifies the agent completing the task or activity, the date, and if appropriate, the document involved. The Gantt Chart 7 schedule bar then displays a black box within the green schedule bar corresponding to the date completed. If the report is not received by the "due" date (i.e., end of the green bar), the Gantt Chart Generator 6 illuminates the schedule bar in red for each successive day that it is late, until the agent updates the Gantt Chart to indicate that the task is finally "completed."

An important aspect of the present invention's creation and the agent's use of the Gantt Chart 7 is that the Gantt Chart Generator 6 enables the listing agent and buyer's agent to monitor and manage more than one real estate transaction at a time by simultaneously displaying a Gantt Chart window on their respective display devices for each transaction that is in progress. Alternatively, the agents may scroll or "page through" each Gantt Chart, enabling the agents to view each Gantt Chart 7 sequentially. This feature of the invention is also supported by the Transaction Manager 2 unit which stores the information obtained for each transaction in a separate set of System and Transaction Tables, which are accessed by the Gantt Chart Generator 6, and the Manager 2 unit processes and manages each pending transaction simultaneously with all other pending transactions.

Figure 17:
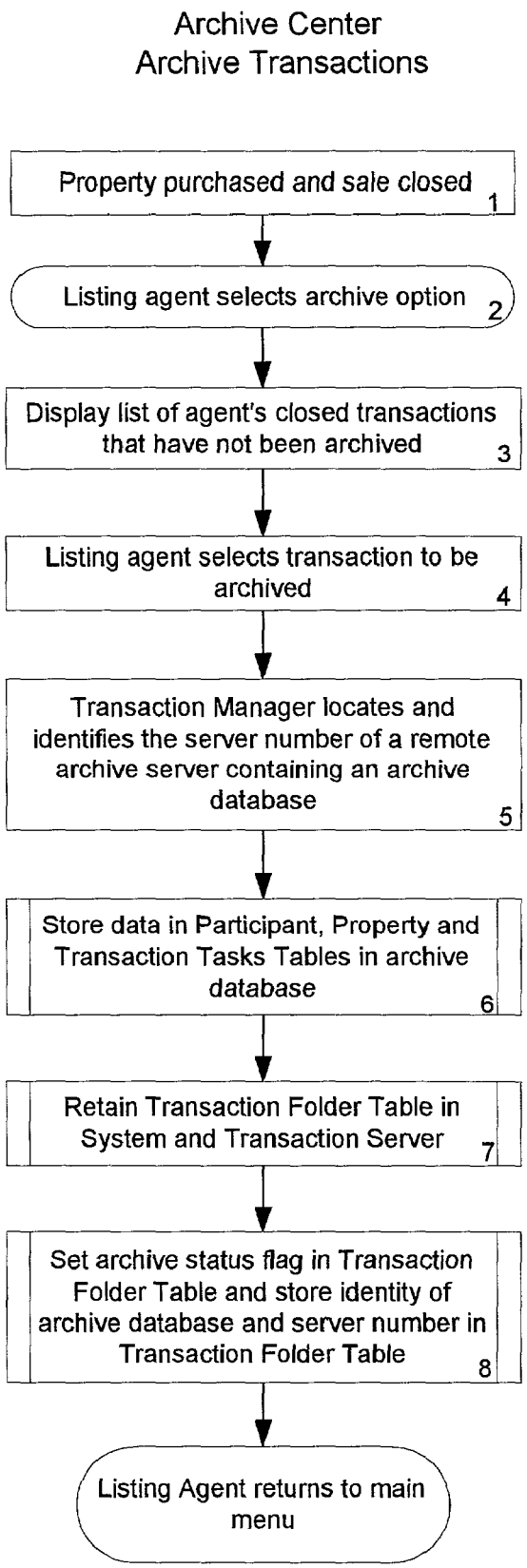
FIG. 17 is a flow chart which illustrates the manner in which the present invention archives real estate transactions.

The Transaction Manager 2 unit continually monitors, and in a preferred embodiment no less than daily, all transaction tasks on the Gantt Chart 7 to determine if all tasks have been completed. When the Transaction Manager 2 unit determines that all transaction tasks are, in fact, completed it stores all of the information contained in the Transaction Tasks Table 21(*c*) and all of the information recorded by the agents using the Task History screen into the Transaction Folder Table 9. The Transaction Tasks Table 21(*c*) now contains a permanent record of the entire real estate transaction. Once this information is stored, a Pre-Closing Report Generator 10 uses the information to generate and display a pre-closing report to both agents. A sample pre-closing report is illustrated in FIG. 16. The report lists all of the transaction tasks that were identified by the agents and performed during the transaction after the seller and buyer entered into a purchase and sale agreement. A "Date Due" column corresponds to the date that was scheduled by the Schedule Manager 4 unit or by the agent responsible for completion of the task using the Task Scheduler screen, and the "Date Completed" column contains the date each transaction was completed. If the transaction task was completed on time, a check mark is placed in an "On Time" box next to the date completed. If all transaction tasks were completed on time, the pre-closing report recommends that the transaction is in a condition to be closed. If any task was not completed timely, the report identifies the late task or tasks and recommends that further agent review is warranted. The Pre-Closing Report Generator 10 also produces a seller's and a buyer's closing statement using the financial information extracted by the Schedule Manager 4 unit from the purchase and sale agreement and sends the information to the Pre-Closing Report Generator 10. A sample closing statement is illustrated in FIG. 17.

Figure 18:
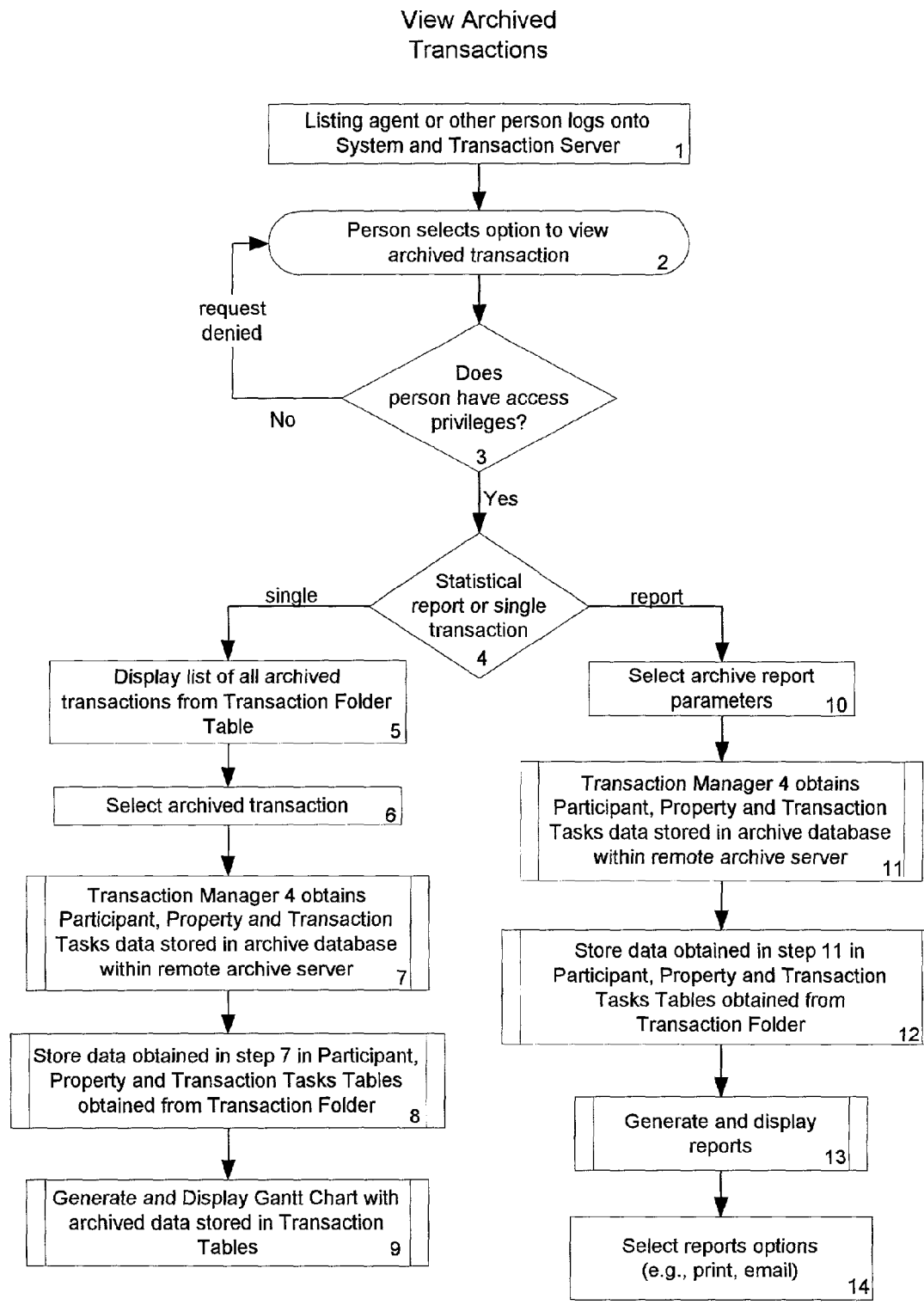
FIG. 18 is a flow chart which illustrates the manner in which the present invention retrieves archived transactions.

Another important feature of the present invention is that the invention allows the listing agents to archive on a remote server each transaction that is closed. FIG. 18 is a flow chart which illustrates the steps involved in using the Archive Transaction 12 program. After the purchase and sale of a listed property has closed, at step 1, the Transaction Manager 2 unit displays, at step 2, an archive option menu to the listing agent. Selecting this option causes the Manager 2, at step 3, to display a list of the listing agent's transactions that have not been archived. At step 4, the listing agent selects each transaction that he or she desires to archive. At step 5, the Transaction Manager 2 unit automatically locates and identifies the server identification number of a remote archive server containing an archive database. At step 6, the Manager 2 obtains the information stored in the Transaction Tables 21 (i.e., Participant 21(*a*), Property 21(*b*) and Transaction Tasks 21(*c*) Tables) and stores the information in similar tables within the archive database. At step 7, Transaction Manager 2 unit retains the Transaction Folder Table 9 in memory of the System 1. The Manager 2, at step 8, sets a status flag in the Transaction Folder Table 9 and also stores the identity, the archive database and server number in the Folder Table 9.

The Search and Retrieve 13 program is used to search, retrieve and view an archived transaction or to obtain a report about a plurality of transactions. This aspect of the invention is illustrated in FIG. 19. The listing agent or other authorized person logs onto the System and Transaction Server 1 at step 1. At step 2, the person selects the view archive option. The Manager 2 determines, at step 3, if the person has access privileges, and if so, is asked at step 4, if the person wants to view a single transaction or obtain a report about a plurality of transactions.

If the person desires to review a single transaction, at step 5, the Manager 2 displays a list of all archived transactions form the Transaction Folder Table (i.e., all flagged transactions). At step 6, the person is prompted to select an archived transaction. After doing so, the Transaction Manager 2 obtains, at step 7, the Participant, Property and Transaction Tasks data stored in the archive database within the remote archive server, and at step 8 is, respectively, stored in the Participant, Property and Transaction Tasks Tables obtained from the Transaction Folder Table 9. At step 9, the Transaction Manager 2 unit and Gantt Chart Generator 6 display a Gantt Chart 7 using the archived data stored in the Transaction Tables 21.

If the person desires to obtain a report of a plurality of transactions (e.g., all of the closings that have occurred for a given property), the person is prompted, at step 10, to select certain report parameters (e.g., all closings over the last fifteen (15) years). After doing so, the Transaction Manager 2 unit obtains, at step 11, the Participant, Property and Transaction Tasks data stored in the archive database within the remote archive server, and at step 12 is, respectively, stored in the Participant, Property and Transaction Tasks Tables obtained from the Transaction Folder Table 9. At step 13, the Transaction Manager 2 unit generates and displays the selected reports, and at step 14, the person is given options to print, email or store the reports.

While the present invention has been described with reference to a few embodiments, the description is illustrative of the invention and is not to be construed as limiting the invention. Various modifications may occur to those skilled in the art without departing from the scope of the invention as defined by the appended claims.

What is claimed is:

1. A method of assisting a listing agent and a buyer's agent in at least one transaction to close a purchase and sale of a property between a seller and a buyer comprising steps of:
   a) retrieving at least one form document from a real estate forms database;
   b) retrieving at least one system task from a task table;
   c) associating said at least one form document with said at least one system task;
   d) accepting input from the buyer's agent identifying at least one preliminary transaction task which corresponds to said at least one system task, whereby said at least one preliminary transaction task is associated with said at least one form document due to said document's association with said at least one system task;
   e) accepting input from the buyer's agent establishing a task schedule consisting of a start date and a due date for said at least one preliminary transaction task;
   f) generating a preliminary Gantt chart consisting of:
      (1) the at least one preliminary transaction task;
      (2) a schedule bar associated with said at least one preliminary transaction task, said schedule bar divided into consecutive dates and extending from the start date to the due date established for said at least one preliminary transaction task; and
      (3) a form document access indicator associated with said at least one preliminary transaction task, whereby said form document access indicator is also associated with said at least one form document due to said document's association with said at least one preliminary transaction task, with said form document access indicator enabling the buyer's agent to access and display said at least one form document;

g) displaying the preliminary Gantt chart to the buyer's agent;

h) accepting input from the buyer's agent selecting the form document access indicator which is associated with said at least one preliminary transaction task, and displaying said at least one form document to the buyer's agent;

i) accepting input from the buyer's agent causing said at least one form document to be provided to the buyer, whereby the at least one preliminary transaction task is completed;

j) automatically updating the preliminary Gantt chart at the time and on the date corresponding to the date said at least one form document is provided to the buyer;

k) accepting input from the buyer's agent which identifies a buyer, the buyer's contact information, the buyer's agent, the buyer's agent's contact information and the address of the listed property;

l) based upon the address of the listed property, retrieving information which identifies the seller, the seller's contact information, the listing agent, the listing agent's contact information, and a description of the property from a multiple listing service database;

m) retrieving a purchase and sale agreement form document from the real estate forms database;

n) retrieving a purchase and sale agreement system task from the task table;

o) associating said purchase and sale agreement form document with said purchase and sale agreement system task;

p) accepting input from the buyer's agent identifying a purchase and sale agreement preliminary transaction task which corresponds to said purchase and sale agreement system task, whereby said purchase and sale agreement preliminary transaction task is associated with said purchase and sale agreement form document due to said document's association with said purchase and sale agreement system task;

q) accepting input from the buyer's agent establishing a task schedule consisting of a start date and a due date for said purchase and sale agreement preliminary transaction task;

r) generating a preliminary Gantt chart also consisting of:
  (1) the purchase and sale agreement preliminary transaction task;
  (2) a schedule bar associated with the purchase and sale agreement preliminary transaction task, said schedule bar divided into consecutive dates and extending from the start date to the due date established for said purchase and sale agreement preliminary transaction task; and
  (3) a form document access indicator associated with the purchase and sale agreement preliminary transaction task, whereby said form document access indicator is also associated with said purchase and sale agreement form document due to said document's association with said purchase and sale agreement preliminary transaction task, and said form document access indicator enabling the buyer's agent to access and display said purchase and sale agreement form document;

s) displaying the preliminary Gantt chart to the buyer's agent;

t) accepting input from the buyer's agent selecting the form document access indicator which is associated with said purchase and sale agreement preliminary transaction task, and displaying said purchase and sale agreement form document to the buyer's agent;

u) automatically completing a first portion of the purchase and sale agreement form document using the information obtained in steps (k) and (l) above and displaying the document to the buyer's agent; and v) accepting input from the buyer's agent which completes a second portion of the purchase and sale agreement form document, said input consisting of at least one set of task schedule information;

w) retrieving at least one vendor from a vendor database;

x) associating a vendor order form with said at least one vendor;

y) retrieving at least one additional system task from the task table;

z) associating said at least one vendor with said at least one additional system task;

aa) associating said at least one set of task schedule information with said at least one additional system task;

bb) accepting input from the buyer's agent identifying at least one additional transaction task which corresponds to said at least one additional system task, whereby said at least one additional transaction task is associated with said at least one vendor due to said vendor's association with said at least one additional system task, and said at least one additional transaction task is also associated with said at least one set of task schedule information due to said information's association with said at least one system task;

cc) extracting a start date and a due date from the at least one set of task schedule information for said at least one additional transaction task;

dd) generating a consolidated Gantt chart, consisting of the preliminary Gantt chart and further consisting of:
  (1) the at least one additional transaction task;
  (2) a schedule bar associated with each at least one additional transaction task, said schedule bar divided into consecutive dates and extending from the start date to the due date extracted for said at least one additional transaction task; and
  (3) a vendor access indicator associated with said at least one additional transaction task, whereby said vendor access indicator is also associated with said at least one vendor due to said vendor's association with said at least one additional transaction task, and said vendor access indicator enabling the buyer's agent to access said at least one vendor in order to obtain a desired vendor service;

ee) displaying the consolidated Gantt chart to the buyer's agent and listing agent;

ff) accepting input from the buyer's agent selecting the vendor access indicator which is associated with the at least one additional transaction task which corresponds to said desired vendor service, displaying said at least one vendor to the buyer's agent, accepting input from the buyer's agent selecting a vendor out of the said at least one vendor, automatically completing a first portion of the vendor order form associated with the selected vendor using the information obtained in steps (k) and (l) above, and displaying the vendor order form containing the first completed portion to the buyer's agent;

gg) accepting input from the buyer's agent consisting of a request for a vendor response from the vendor and a desired date by which the desired vendor service must be completed, said input completing a second portion of the vendor order form, and providing the vendor order form, containing the first and second completed portions, to the selected vendor;

hh) accepting input from the selected vendor consisting of the vendor response and a promised date by which the vendor agrees to complete the desired vendor service, said input completing a third portion of the vendor order form, and providing the vendor order form, containing the first, second and third completed portions, to the buyer's agent requesting a response from said agent;

ii) accepting input from the buyer's agent responding to the vendor by accepting the vendor response, whereby the vendor agrees to provide the desired vendor service and the buyer's agent agrees, on behalf of the buyer, to pay for the service; and jj) automatically updating the consolidated Gantt chart at the time and on the date corresponding to the date when the buyer's agent provides said vendor order form to the selected vendor requesting a response, and when the selected vendor's response is accepted by the buyer's agent.

2. The method of claim 1 in which the step of automatically updating the consolidated Gantt chart includes displaying a pending status indicator on a date within the schedule bar, associated with the at least one additional transaction task which is associated with the selected vendor service, at the time and corresponding to the date said buyer's agent provides said vendor order form to the selected vendor requesting a response, and similarly displaying an accepted status indicator on a date within the schedule bar at the time and corresponding to the date the selected vendor's response is accepted by the buyer's agent.

3. The method of claim 1 also consisting of automatically updating the Gantt chart by displaying a desired date status indicator on a date within the schedule bar, associated with the at least one additional transaction task which is associated with the selected vendor service, at the time said buyer's agent inputs said desired date, and corresponding to the desired date input by the agent.

4. The method of claim 1 also consisting of automatically updating the Gantt chart by displaying a promised date status indicator on a date within the schedule bar, associated with the at least one additional transaction task which is associated with the selected vendor service, at the time said vendor inputs said promised date, and corresponding to the promised date input by the vendor.

5. The method of claim 2, 3 or 4 which includes the additional step of displaying the updated consolidated Gantt chart to the buyer's agent and listing agent.

6. The method of claim 1 which includes the additional step of accepting input from the buyer's agent indicating that the selected vendor has completed the at least one additional transaction task which is associated with the vendor service.

7. The method of claim 6 which includes the additional step of automatically updating the consolidated Gantt chart when the date that the vendor service is completed.

8. The method of claim 7 in which the step of updating the consolidated Gannet chart includes displaying a completed date status indicator on a date within the schedule bar, associated with the at least one additional transaction task which is associated with the selected vendor service, corresponding to the date that the vendor service was completed.

9. The method of claim 1 comprising the additional steps of:

a) retrieving at least one vendor from a vendor database;

b) associating a vendor order form with said at least one vendor c) retrieving at least one additional system task from the task table;

d) associating said at least one vendor with said at least one additional system task;

e) associating said at least one set of task schedule information with said at least one additional system task;

f) accepting input from the listing agent identifying at least one additional transaction task which corresponds to said at least one additional system task, whereby said at least one additional transaction task is associated with said at least one vendor due to said vendor's association with said at least one additional system task, and said at least one additional transaction task is also associated with said at least one set of task schedule information due to said information's association with said at least one system task;

g) extracting a start date and a due date from the at least one set of task schedule information for said at least one additional transaction task;

h) generating a consolidated Gantt chart, consisting of the preliminary Gantt chart and further consisting of:

(1) the at least one additional transaction task;

(2) a schedule bar associated with each at least one additional transaction task, said schedule bar divided into consecutive dates and extending from the start date to the due date extracted for said at least one additional transaction task; and (3) a vendor access indicator associated with said at least one additional transaction task, whereby said vendor access indicator is also associated with said at least one vendor due to said vendor's association with said at least one additional transaction task, and said vendor access indicator enabling the listing agent to access said at least one vendor in order to obtain a desired vendor service;

i) displaying the consolidated Gantt chart to the buyer's agent and listing agent;

j) accepting input from the listing agent selecting the vendor access indicator which is associated with the at least one additional transaction task which corresponds to said desired vendor service, displaying said at least one vendor to the listing agent, accepting input from the listing agent selecting a vendor out of the said at least one vendor, automatically completing a first portion of the vendor order form associated with the selected vendor using the information obtained in claim 18, steps (k) and (l), and displaying the vendor order form containing the first completed portion to the listing agent;

k) accepting input from the listing agent consisting of a request for a vendor response from the vendor and a desired date by which the desired vendor service must be completed, said input completing a second portion of the vendor order form, and providing the vendor order form, containing the first and second completed portions, to the selected vendor;

l) accepting input from the selected vendor consisting of the vendor response and a promised date by which the vendor agrees to complete the desired vendor service, said input completing a third portion of the vendor order form, and providing the vendor order form, containing the first, second and third completed portions, to the listing agent requesting a response from said agent;

m) accepting input from the listing agent responding to the vendor by accepting the vendor response, whereby the vendor agrees to provide the desired vendor service and the listing agent agrees, on behalf of the buyer, to pay for the service; and n) automatically updating the consolidated Gantt chart at the time and on the date corresponding to the date when the listing agent provides said vendor order form to the selected vendor requesting a response, and when the selected vendor's response is accepted by the listing agent.

10. The method of claim 9 in which the step of automatically updating the consolidated Gantt chart includes displaying a pending status indicator on a date within the schedule bar, associated with the at least one additional transaction task which is associated with the selected vendor service, at the time and corresponding to the date said listing agent provides said vendor order form to the selected vendor requesting a response, and similarly displaying an accepted status indicator on a date within the schedule bar at the time and corresponding to the date the selected vendor's response is accepted by the listing agent.

11. The method of claim 9 also consisting of automatically updating the Gantt chart by displaying a desired date status indicator on a date within the schedule bar, associated with the at least one additional transaction task which is associated with the selected vendor service, at the time said listing agent inputs said desired date, and corresponding to the desired date input by the agent.

12. The method of claim 9 also consisting of automatically updating the Gantt chart by displaying a promised date status indicator on a date within the schedule bar, associated with the at least one additional transaction task which is associated with the selected vendor service, at the time said vendor inputs said promised date, and corresponding to the promised date input by the vendor.

13. The method of claim 10, 11 or 12 which includes the additional step of displaying the updated consolidated Gantt chart to the buyer's agent and listing agent.

14. The method of claim 9 which includes the additional step of accepting input from the listing agent indicating that the selected vendor has completed the at least one additional transaction task which is associated with the vendor service.

15. The method of claim 6 which includes the additional step of automatically updating the consolidated Gantt chart when the vendor service is completed.

16. The method of claim 7 in which the step of updating the consolidated Gantt chart includes displaying a completed date status indicator on a date within the schedule bar, associated with the at least one additional transaction task which is associated with the selected vendor service, corresponding to the date that the vendor service was completed.

17. The method of claim 1, 8 or 16 which includes the additional step of generating a pre-closing report for the at least one transaction when each at least one preliminary transaction task and each at least one additional transaction task have been completed, whereby said report indicates whether each transaction task has been completed on or before said task's due date.

18. The method of claim 1, 2, 3, 4, 8, 10, 11, 12 or 16 which includes the additional step of archiving for the at least one transaction the description of the property, the information about the buyer, seller, buyer's agent and listing agent, and each at least one preliminary and additional transaction task, and for each preliminary and additional transaction task, archiving the task schedule, each status indicator and its corresponding date, and if related to the task, each form document and each vendor order form which has been accepted.

19. The method of claim 1 or 9 which includes the additional step of displaying the consolidated Gantt chart to the seller.

20. The method of claim 1 or 9 which includes the additional step of displaying the consolidated Gantt chart to the buyer.

21. The method of any one of claim 1 or 9 in which the steps are repeated for each transaction out of a plurality of transactions.

22. A system for assisting a listing agent and a buyer's agent in at least one transaction to close the purchase and sale of a property between a seller and a buyer, said system comprising:

a) a listing agent display device and a buyer's agent display device;

b) a Gantt chart generator unit which generates and displays a Gantt chart on the listing agent display device and the buyer's agent display device;

c) the Gantt chart displaying at least one transaction task and an associated schedule bar, said schedule bar divided into consecutive date segments and extending from a predetermined start date to a predetermined due date, said Gantt chart also having a vendor access indicator associated with said at least one transaction task whereby the vendor access indicator may be used by the buyer's agent to input the agent's desire to access a vendor and order a vendor service;

d) a vendor manager unit which accepts input from the buyer's agent, who selects the vendor access indicator in order to access a vendor, and displays a list of vendors on the buyer's agent display device;

e) an order manager unit which accepts a select input from the buyer's agent, who selects a vendor from the list of vendors, and displays a vendor order form on the buyer's agent display device, accepts a request input from the buyer's agent which the order manager uses to complete a first portion of the vendor order form, whereby the vendor order form contains the buyer's agent's request for a response and quote from the selected vendor and a desired date by which the vendor service is to be completed, accepts a send input from the buyer's agent selecting a send to vendor indicator on the order form which causes the order manager unit to notify the selected vendor of the vendor order, accepts a response input from the selected vendor which the vendor order manager uses to complete a second portion of the vendor order form, whereby the vendor order form contains the selected vendor's response and quote and contains a promised date by which the vendor service is to be completed, accepts a send input from the selected vendor selecting a send to agent indicator on the order form which causes the order manager unit to notify the buyer's agent of the vendor's response, and the order manager unit accepts an accept input from the buyer's agent selecting an accept indicator on the order form, whereby the buyer's agent accepts the vendor's response and quote.

23. The system in claim 22 in which the order manager unit automatically completes an initial portion of the vendor order form before it is displayed to the buyer's agent.

24. The system in claim 22 in which the schedule bar is rectangular in shape.

25. The system in claim 22 in which the schedule bar has a first color.

26. The system in claim 22 in which the schedule bar's first color is green.

27. The system in claim 22 in which the Gantt chart generator unit automatically updates the Gantt chart by displaying a desired date status indicator on a date within the schedule bar for the at least one transaction task corresponding to the desired date by which the vendor service is to be completed.

28. The system in claim 22 in which the Gantt chart generator unit automatically updates the Gantt chart by displaying a promised date status indicator on a date within the schedule bar for the at least one transaction task corresponding to the promised date by which the vendor service is to be completed.

29. The system in claim 25 in which the Gantt chart generator unit automatically updates the Gantt chart by changing the color of the schedule bar from said first color to a second color at the time the buyer's agent selects the send indicator on the order form which causes the order manager unit to notify the selected vendor of the vendor order.

30. The system in claim 29 in which the Gantt chart generator unit automatically updates the Gantt chart by changing the color of the schedule bar from the second color back to the first color at the time the buyer's agent selects the accept indicator.

31. The system in claim 29 or 30 in which the schedule bar's first color is green and the second color is yellow.

32. The system in claim 22 in which a task history unit accepts input from the buyer's agent who selects an update status indicator and inputs a completed date in order to indicate that the at least one transaction task has been completed and the Gantt chart generator automatically updates the Gantt chart by displaying a completed status indicator on the date within the schedule bar for the at least one transaction task corresponding to the completed date, whereby the completed status indicator indicates that the at least one transaction task is completed.

33. A system for assisting a listing agent and a buyer's agent in at least one transaction to close the purchase and sale of a property between a seller and a buyer, said system comprising:
   a) a listing agent display device and a buyer's agent display device;
   b) a Gantt chart generator unit which generates and displays a Gantt chart on the listing agent display device and the buyer's agent display device;
   c) the Gantt chart displaying at least one transaction task and an associated schedule bar, said schedule bar divided into consecutive segments and extending from a predetermined start date to a predetermined due date, said Gantt chart also having a vendor access indicator associated with said at least one transaction task whereby the vendor access indicator may be used by the listing agent to input the agent's desire to access a vendor and order a vendor service;
   d) a vendor manager unit which accepts input from the listing agent, who selects the vendor access indicator in order to access a vendor, and displays a list of vendors on the listing agent display device;
   e) an order manager unit which accepts a select input from the listing agent, who selects a vendor from the list of vendors, and displays a vendor order form on the listing agent display device, accepts a request input from the listing agent which the order manager uses to complete a first portion of the vendor order form whereby the vendor order form contains the listing agent's request for a response and quote from the selected vendor and a desired date by which the vendor service is to be completed, accepts a send input from the listing agent selecting a send to vendor indicator on the order form which causes the order manager unit to notify the selected vendor of the vendor order, accepts a response input from the selected vendor which the vendor order manager uses to complete a second portion of the vendor order form, whereby the vendor order form contains the selected vendor's response and quote and contains a promised date by which the vendor service is to be completed, accepts a send input from the selected vendor selecting a send to agent indicator on the order form which causes the order manager unit to notify the buyer's agent of the vendor's response, and the order manager unit accepts an accept input from the listing agent selecting an accept indicator on the order form, whereby the listing agent accepts the vendor's response and quote.

34. The system in claim 33 in which the order manager unit automatically completes an initial portion of the vendor order form before it is displayed to the listing agent.

35. The system in claim 33 in which the schedule bar is rectangular in shape.

36. The system in claim 33 in which the schedule bar has a first color.

37. The system in claim 33 in which the schedule bar's first color is green.

38. The system in claim 33 in which the Gantt chart generator unit automatically updates the Gantt chart by displaying a desired date status indicator on a date within the schedule bar for the at least one transaction task corresponding to the desired date by which the vendor service is to be completed.

39. The system in claim 33 in which the Gantt chart generator automatically updates the Gantt chart by displaying a promised date status indicator on a date within the schedule bar for the at least one transaction task corresponding to the promised date by which the vendor service is to be completed.

40. The system in claim 36 in which the Gantt chart generator unit automatically updates the Gantt chart by changing the color of the schedule bar from said first color to a second color at the time the listing agent selects the send indicator on the order form which causes the order manager unit to notify the selected vendor of the vendor order.

41. The system in claim 40 in which the Gantt chart generator unit automatically updates the Gantt chart by changing the color of the schedule bar from the second color back to the first color at the time the listing agent selects the accept indicator.

42. The system in claim 40 or 41 in which the schedule bar's first color is green and the second color is yellow.

43. The system in claim 33 in which a task history unit accepts input from the listing agent who selects an update status indicator and inputs a completed date in order to indicate that the at least one transaction task has been completed and the Gantt chart generator automatically updates the Gantt chart by displaying a completed date status indicator on the date within the schedule bar for the at least one transaction task corresponding to the completed date, whereby the completed status indicator indicates that the at least one transaction task is completed.

44. The system in claim 27 or 38 in which the desired date status indicator is square in shape.

45. The system in claim 27 or 38 in which the desired date status indicator is light gray in color.

46. The system in claim 28 or 39 in which the promised date status indicator is square in shape.

47. The system of claim 28 or 39 in which the promised date status indicator is gray in color.

48. The system in claim 32 or 43 in which the completed date status indicator is square in shape.

49. The system in claim 32 or 43 in which the completed date status indicator is black in color.

50. The system in claim 22 or 23 in which the Gantt chart generator unit automatically adds at least one late date segment to the schedule bar corresponding to each date, after the predetermined due date, for which said completed status indicator has not been displayed, indicating that the at least one transaction task has not been completed.

51. The system as in claim 22 or 23 in which a client interface unit displays the Gantt chart to the seller on a seller display device.

52. The system as in any one of claim 22 or 33 in which a client interface unit displays the Gantt chart to the buyer on a buyer display device.

53. The system in claim 32 or 43 in which a pre-closing report generator generates a pre-closing report when each at least one transaction task has been completed, whereby said pre-closing report indicates whether said at least one transaction task has been completed on or before the task's due date.

54. The system as in claim 22 or 33 in which the Gantt chart generator generates and displays a Gantt chart on the listing agent display device and on the buyer's agent display device for each transaction out of a plurality of transactions.

55. The method of claim 21 in which the step of displaying the consolidated Gantt chart to the buyer's agent and listing agent includes displaying each chart simultaneously.

56. The method of claim 21 in which the step of displaying the consolidated Gantt chart to the buyer's agent and listing agent includes displaying each chart sequentially.

57. The system of claim 50 in which the Gantt chart generator unit displays a late status indicator within said at least one late date segment.

58. The system of claim 57 in which the late status indicator is red in color.

59. The system of claim 54, in which the Gantt chart generator displays the Gantt chart for each transaction simultaneously.

60. The system of claim 54 in which the Gantt chart generator displays the Gantt chart for each transaction sequentially.

\* \* \* \* \*

UNITED STATES PATENT AND TRADEMARK OFFICE
CERTIFICATE OF CORRECTION

PATENT NO. : 7,353,183 B2 Page 1 of 1
APPLICATION NO. : 09/908290
DATED : April 1, 2008
INVENTOR(S) : Daniel R. Musso It is certified that error appears in the above-identified patent and that said Letters Patent is hereby corrected as shown below:

Column 27,
Line 60, delete "Gannet" and insert -- Gantt -- therefor.

Column 28,
Line 49, delete "claim 18," and insert -- claim 1, -- therefor.

Column 33,
Line 9, delete "claim 22 or 23" and insert -- claim 22 or 33 -- therefor.

Column 33,
Line 15, delete "claim 22 or 23" and insert -- claim 22 or 33 -- therefor.

Signed and Sealed this

First Day of July, 2008

JON W. DUDAS
*Director of the United States Patent and Trademark Office*